(12) United States Patent
Naess et al.

(10) Patent No.: US 9,639,165 B2
(45) Date of Patent: May 2, 2017

(54) POSITION DETECTION SYSTEM AND CONTROL METHOD OF POSITION DETECTION SYSTEM

(71) Applicant: SEIKO EPSON CORPORATION, Tokyo (JP)

(72) Inventors: Hallvard Naess, Trondheim (NO); Tormod Njolstad, Trondheim (NO); Sverre Dale Moen, Oslo (NO); Karol Marcin Pawlak, Trondheim (NO); Shinji Kubota, Ina-shi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/598,795

(22) Filed: Jan. 16, 2015

(65) Prior Publication Data
US 2015/0205345 A1 Jul. 23, 2015

(30) Foreign Application Priority Data

Jan. 21, 2014 (JP) .................................. 2014-008627
Mar. 25, 2014 (JP) .................................. 2014-062102

(51) Int. Cl.
G06F 3/01 (2006.01)
G06F 3/03 (2006.01)
G06F 3/042 (2006.01)

(52) U.S. Cl.
CPC ............ G06F 3/017 (2013.01); G06F 3/0304 (2013.01); G06F 3/0425 (2013.01)

(58) Field of Classification Search
CPC ........ G06F 3/005; G06F 3/017; G06F 3/0304; G06F 3/0425

USPC .......................................... 345/179, 170-175
See application file for complete search history.

(56) References Cited

U.S. PATENT DOCUMENTS

| | | | | |
|---|---|---|---|---|
| 5,528,263 A | * | 6/1996 | Platzker | G06F 3/011 345/156 |
| 5,694,142 A | * | 12/1997 | Dumoulin | G06F 3/013 345/156 |
| 5,914,709 A | * | 6/1999 | Graham | G02B 6/32 345/173 |
| 6,731,330 B2 | * | 5/2004 | Lin | G06F 3/0425 345/156 |
| 6,829,394 B2 | * | 12/2004 | Hiramatsu | G06K 9/2054 345/157 |

(Continued)

FOREIGN PATENT DOCUMENTS

| | | |
|---|---|---|
| JP | 2008-052366 A | 3/2008 |
| JP | 4757144 B2 | 8/2011 |

*Primary Examiner* — Tony Davis
(74) *Attorney, Agent, or Firm* — Oliff PLC

(57) ABSTRACT

A projection system includes a light emitting apparatus that emits detection light to a detection area for detecting indication positions of indicators, and a projector that detects the indication positions of the indicators in the detection area. The projector includes an imaging portion that captures an image of the detection area, and a position detection portion that detects at least one of an image of light generated by the indicator and an image of the detection light reflected on the indicator from data of a captured image of the imaging portion, and discriminates and detects the indication positions of the indicator and the indicator based on light emission timings of the indicator and the light emitting apparatus.

9 Claims, 17 Drawing Sheets

(56) References Cited

U.S. PATENT DOCUMENTS

| | | | |
|---|---|---|---|
| 6,999,061 B2* | 2/2006 | Hara | G06F 3/04883 178/18.01 |
| 7,027,041 B2* | 4/2006 | Nishimura | G06F 3/017 345/156 |
| 7,098,891 B1* | 8/2006 | Pryor | G06F 3/011 345/158 |
| 7,176,890 B2* | 2/2007 | Kitaguchi | G06F 1/1601 345/158 |
| 7,230,611 B2* | 6/2007 | Bischoff | G06F 3/0421 178/18.01 |
| 7,411,575 B2* | 8/2008 | Hill | G06F 3/0421 345/156 |
| 7,483,015 B2* | 1/2009 | Sato | G07F 17/3211 345/156 |
| 7,525,538 B2* | 4/2009 | Bathiche | G02B 5/282 345/175 |
| 7,574,020 B2* | 8/2009 | Shamaie | G06K 9/00355 345/594 |
| 7,593,593 B2* | 9/2009 | Wilson | G06F 3/0421 348/241 |
| 7,619,617 B2* | 11/2009 | Morrison | G06F 3/0428 345/173 |
| 7,719,523 B2* | 5/2010 | Hillis | G06F 3/04883 345/173 |
| 7,728,821 B2* | 6/2010 | Hillis | G06F 3/04883 178/18.01 |
| 7,755,613 B2* | 7/2010 | Morrison | G06F 3/0428 178/18.01 |
| 7,843,449 B2* | 11/2010 | Krah | H04N 13/0402 345/419 |
| 7,911,444 B2* | 3/2011 | Yee | G06F 3/0416 345/156 |
| 8,001,613 B2* | 8/2011 | Duncan | G06F 21/31 726/17 |
| 8,089,462 B2* | 1/2012 | Hill | G06F 3/0428 345/157 |
| 8,159,682 B2* | 4/2012 | Bell | G01B 11/002 356/614 |
| 8,164,640 B2* | 4/2012 | Vartiainen | G06F 1/1626 348/207.2 |
| 8,179,367 B2* | 5/2012 | Kitaura | G06F 3/017 345/156 |
| 8,212,857 B2* | 7/2012 | Keam | G06F 3/0425 345/173 |
| 8,289,299 B2* | 10/2012 | Newton | G06F 3/042 178/18.09 |
| 8,339,378 B2* | 12/2012 | Chtchetinine | G06F 3/0416 178/18.09 |
| 8,456,418 B2* | 6/2013 | Ung | G06F 3/0421 345/158 |
| 8,508,710 B2* | 8/2013 | Huddleston | G06F 3/0425 345/173 |
| 8,692,768 B2* | 4/2014 | Chtchetinine | G06F 3/0325 345/157 |
| 8,780,083 B2 | 7/2014 | Tanaka | |
| 9,011,246 B1* | 4/2015 | Kier | A63F 13/90 463/31 |
| 9,250,746 B2* | 2/2016 | Wala | G06F 3/012 |
| 9,268,411 B2* | 2/2016 | Thelen | G06F 3/0304 |
| 2009/0219253 A1* | 9/2009 | Izadi | G06F 3/0421 345/173 |
| 2010/0201812 A1* | 8/2010 | McGibney | G06F 3/0416 348/143 |
| 2011/0115904 A1* | 5/2011 | Te-Yuan | G06F 3/0428 348/135 |
| 2011/0241988 A1* | 10/2011 | Bensler | G06F 3/03545 345/158 |
| 2011/0248963 A1* | 10/2011 | Lawrence | G03H 1/0005 345/175 |
| 2012/0127074 A1* | 5/2012 | Nakamura | G06F 3/017 345/158 |
| 2012/0127323 A1* | 5/2012 | Kasuya | G03B 17/54 348/189 |
| 2012/0162077 A1* | 6/2012 | Sze | G06F 3/0425 345/163 |
| 2013/0021486 A1* | 1/2013 | Richardson | H04N 5/23203 348/211.11 |
| 2013/0106782 A1* | 5/2013 | Nowatzyk | G06F 3/03545 345/175 |
| 2013/0207937 A1* | 8/2013 | Lutian | G06F 3/042 345/175 |
| 2013/0241822 A1* | 9/2013 | Sharma | G06F 3/02 345/156 |
| 2013/0265228 A1* | 10/2013 | Tamura | G06F 3/033 345/157 |
| 2014/0267031 A1* | 9/2014 | Huebner | G06F 3/0346 345/158 |
| 2015/0177601 A1* | 6/2015 | Imai | G03B 21/142 353/85 |
| 2015/0199071 A1* | 7/2015 | Hou | G06F 3/0416 345/175 |
| 2015/0204658 A1* | 7/2015 | Tamura | G06F 3/0418 356/614 |
| 2015/0204979 A1* | 7/2015 | Naess | G01S 5/16 356/614 |
| 2015/0205345 A1* | 7/2015 | Naess | G06F 3/017 345/156 |
| 2015/0205376 A1* | 7/2015 | Kubota | G06F 3/0418 345/175 |
| 2016/0093035 A1* | 3/2016 | Honda | G06K 9/3241 382/103 |
| 2016/0093036 A1* | 3/2016 | Honda | G06K 9/00369 382/103 |

* cited by examiner

|  | POSITIONAL COORDINATION ON AUTO CALIBRATION IMAGE (CENTRAL COORDINATE) | POSITIONAL COORDINATION ON FRAME MEMORY (CENTRAL COORDINATE) |
|---|---|---|
| MARK 1 | (X1, Y1) | (X2, Y2) |
| MARK 2 | (X3, Y3) | (X4, Y4) |
| MARK 3 | (X5, Y5) | (X6, Y6) |
| . . . | . . . . . | . . . . . |

FIG. 7

LIGHT SOURCE NOISE DATA

POSITION DETECTION SYSTEM AND CONTROL METHOD OF POSITION DETECTION SYSTEM

The entire disclosure of Japanese Patent Application Nos. 2014-008627, filed Jan. 21, 2014 and 2014-062102, filed Mar. 25, 2014 are expressly incorporated by reference herein.

BACKGROUND

1. Technical Field

The present invention relates to a position detection system and a control method of the position detection system.

2. Related Art

In the related art, a technique of detecting a position of an indicator in a detection area by detecting variation ranges of light amount distributions respectively obtained from a plurality of sensor units has been known (for example, Japanese Patent No. 4757144).

If an indication position of an indicator is optically detected, it is not considered that light evenly reaches all the locations in a detection area, and this influences the detection accuracy. At this point, the configuration of Japanese Patent No. 4757144 is to enhance the accuracy by calculating distribution of light amounts, but, for example, when the indication position is detected by capturing an image of the detection area, the method cannot be applied. In addition, when the indication positions of a plurality of indicators in different kinds are detected, a plurality of sensors have to be further provided, and the size of the apparatus configuration increases.

SUMMARY

An advantage of some aspects of the invention is to provide a position detection system that can accurately detect indication positions of different kinds of indicators by using the data of the captured image even if the configuration is simple, and a control method of the position detection system.

An aspect of the invention is directed to a position detection system including: a light emitting apparatus that emits detection light to a detection area for detecting indication positions of indicators; and a position detection apparatus that detects the indication positions of the indicators in the detection area, in which the position detection apparatus includes an imaging portion that captures an image of the detection area, and a position detection portion that detects at least one of an image of light generated by a first indicator of the indicators and an image of the detection light reflected on a second indicator of the indicators from data of a captured image of the imaging portion, and discriminates and detects the indication positions of the first indicator and the second indicator based on light emission timings of the first indicator and the light emitting apparatus.

With this configuration, at least one of an image of light generated by a first indicator of the indicators and an image of the detection light reflected on a second indicator of the indicators from the data of the captured image is detected. In addition, the indication positions of the first indicator and the second indicator are discriminated and detected based on light emission timings of the first indicator and the light emitting apparatus. Therefore, it is possible to accurately detect indication positions of different kinds of indicators by using the data of the captured image even if the configuration is simple.

Another aspect of the invention is directed to the position detection system of the configuration described above, wherein the position detection portion detects a position of a bright spot taken in the data of the captured image after the light emitting apparatus is turned off, as the indication position of the first indicator.

With this configuration, it is possible to easily discriminate the first indicator and the second indicator, and to accurately detect indication positions of different kinds of indicators.

Still another aspect of the invention is directed to the position detection system of the configuration described above, wherein the position detection portion determines light that the plurality of first indicators turn on and off according to identification information allocated to the respective first indicators based on the data of the captured image, and discriminates and detect the indication positions of the plurality of first indicators.

With this configuration, if the plurality of first indicators are provided, it is possible to discriminate and detect the indication positions of the respective first indicators.

Yet another aspect of the invention is directed to the position detection system of the configuration described above, wherein the position detection apparatus includes a first transmitting portion that transmits a synchronization signal for informing lighting timing of the first indicator, and a second transmitting portion that transmits a signal for informing timing at which the detection light is emitted to the light emitting apparatus.

With this configuration, the position detection apparatus can capture an image of the detection area by the imaging portion in synchronization with lighting timings of the first indicator and the light emitting apparatus. Therefore, it is possible to detect the indication positions of the first and second indicators.

Still yet another aspect of the invention is directed to a control method of a position detection system that includes a light emitting apparatus that emits detection light to a detection area for detecting indication positions of indicators and a position detection apparatus that detects the indication positions of the indicators in the detection area, including: capturing an image of the detection area by an imaging portion; and detecting at least one of an image of light generated by a first indicator of the indicators and an image of the detection light reflected on a second indicator of the indicators from data of a captured image of the imaging portion, and discriminating and detecting the indication positions of the first indicator and the second indicator based on light emission timings of the first indicator and the light emitting apparatus.

With this configuration, at least one of an image of light generated by a first indicator of the indicators and an image of the detection light reflected on a second indicator of the indicators from the data of the captured image is detected. In addition, the indication positions of the first indicator and the second indicator are discriminated and detected based on light emission timings of the first indicator and the light emitting apparatus. Therefore, it is possible to accurately detect indication positions of different kinds of indicators by using the data of the captured image even if the configuration is simple.

According to the aspects of the invention, it is possible to accurately detect indication positions of different kinds of indicators by using the data of the captured image even if the configuration is simple.

BRIEF DESCRIPTION OF THE DRAWINGS

The invention will be described with reference to the accompanying drawings, wherein like numbers reference like elements.

FIG. 7 is a diagram illustrating an example of a calibration data managing table.

DESCRIPTION OF EXEMPLARY EMBODIMENTS

Hereinafter, embodiments of the invention are described with reference to the accompanying drawings.

Figure 1:
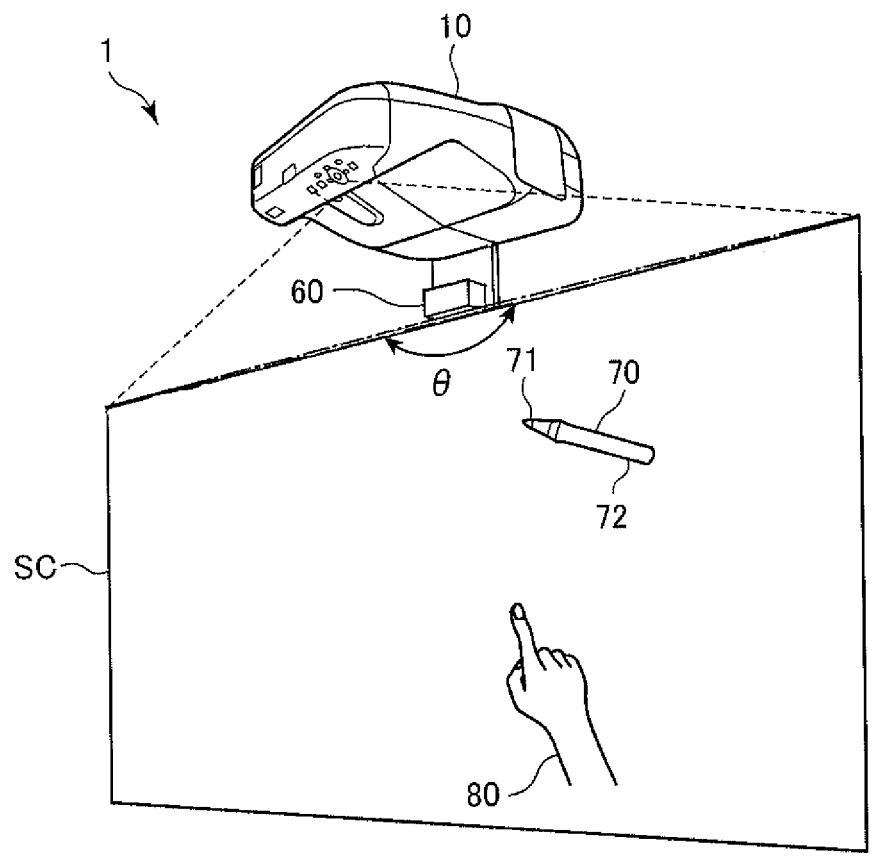
FIG. 1 is a diagram schematically illustrating a configuration of a projection system.

FIG. 1 is a diagram illustrating a configuration of a projection system 1 according to the embodiment to which the invention is applied. The projection system 1 includes a projector 10 (position detection apparatus) installed on the upper side of a screen SC (projection surface) and a light emitting apparatus (light source portion) 60 installed on the upper side of the screen SC.

The projector 10 is installed right above or on the obliquely upper side of the screen SC, and projects an image toward the screen SC on the obliquely lower side. In addition, the screen SC described in the present embodiment is a flat board or a screen fixed on a surface of a wall or stood on a floor. The invention is not limited to this example, and a surface of a wall can be used as the screen SC. In this case, the projector 10 and the light emitting apparatus 60 may be mounted on the upper portion of the surface of the wall used as the screen SC.

The projector 10 is connected to an external image supplying apparatus such as a personal computer (PC), a video reproducing apparatus, or a DVD reproducing apparatus, and projects an image on the screen SC based on the analog image signal or the digital image data supplied from the image supplying apparatus. In addition, the projector 10 may read image data stored in the embedded storage portion 110 (FIG. 2) or externally connected recording medium, and display an image on the screen SC based on the image data.

The light emitting apparatus 60 has a light source portion 61 (FIG. 2) formed of a solid light source and diffuses and emits (applies) light (infrared light according to the present embodiment) generated by the light source portion 61 along the screen SC. The emission scope of the light emitting apparatus 60 is illustrated by an angle θ in FIG. 1. The light emitting apparatus 60 is installed above from the upper end of the screen SC and downwardly emits the light in the scope of the angle θ, and the light forms a light layer along the screen SC. The angle θ according to the present embodiment reaches almost 180°, and the light layer is formed on nearly the entire screen SC. It is preferable that the front surface of the screen SC and the light layer are close to each other, and the distance between the front surface of the screen SC and the light layer according to the present embodiment is roughly in the scope of 1 mm to 10 mm.

When the indication operation is performed on the screen SC, the projection system 1 detects the indication position by the projector 10.

The indicator used in the indication operation can use a pen-type indicator 70. Since an operating switch 75 (FIG. 2) that operates when being pressed is embedded on a tip portion 71 of the indicator 70, if an operation of pressing the tip portion 71 on the wall or the screen SC is performed, the operating switch 75 is turned on. A user holds a bar-shaped shaft portion 72 in his or her hand and operates the indicator 70 so that the tip portion 71 is in contact with the screen SC or the tip portion 71 is pressed onto the screen SC. A transmitting and receiving portion 74 (FIG. 2) that generates infrared light is provided on the tip portion 71. The projector 10 detects a position of the tip portion 71 as an indication position based on the infrared light generated by the indicator 70.

In addition, when the position indication operation is performed by an indicator 80 which is a finger of the user, the user causes the finger to come into contact with the screen SC. In this case, a position on which the indicator 80 comes into contact with the screen SC is detected. That is, when the tip of the indicator 80 (for example, a fingertip) is in contact with the screen SC, the light layer formed by the light emitting apparatus 60 is blocked. At this point, the light emitted by the light emitting apparatus 60 is reflected on the indicator 80, and a portion of the reflected light travels from the indicator 80 to the projector 10. Since the projector 10 has a function of detecting the light from the screen SC side, that is, the light from the lower side, with a position detection portion 50 described below, the reflected light of the indicator 80 can be detected. The projector 10 detects an indication operation to the screen SC by the indicator 80, by detecting the reflected light reflected on the indicator 80. In addition, the projector 10 detects the indication position indicated by the indicator 80.

Since the light layer emitted by the light emitting apparatus 60 is close to the screen SC, the position of the indicator 80 at which light is reflected can be considered to be the tip or the indication position which is closest to the screen SC. Therefore, the indication position can be specified based on the reflected light of the indicator 80.

The projection system 1 functions as an interactive white board system, detects an indication operation performed by the user with the indicators 70 and 80, and causes the indication position to be reflected on the projection image. Specifically, the projection system 1 performs a process of drawing a diagram or arranging a character or a symbol on the indication position, a process of drawing a diagram along a locus of the indication position, a process of deleting the drawn diagram or the arranged character or symbol, or the like. In addition, the drawn diagram or the arranged character or symbol on the screen SC can be stored as image data, and can be output to an external apparatus.

Additionally, the projection system 1 may be operated as a pointing device by detecting the indication position, and may output coordinates of the indication position on the image projection area at which the projector 10 projects an image on the screen SC. In addition, a Graphical User Interface (GUI) operation may be performed by using the coordinates.

Figure 2:
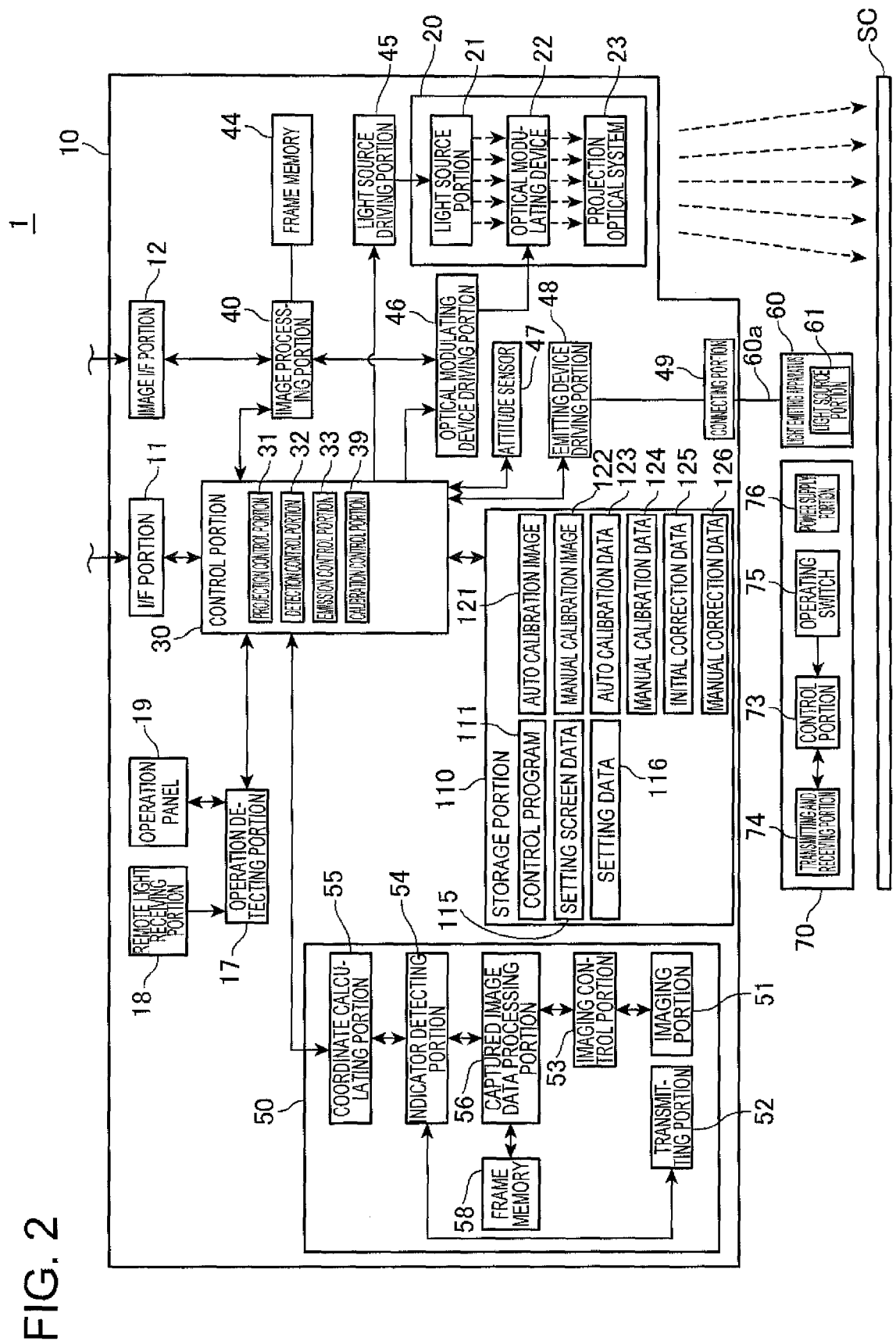
FIG. 2 is a functional block diagram of the projection system.

FIG. 2 is a functional block diagram of respective portions that form the projection system 1.

The projector 10 includes an interface (I/F) portion 11 and an image interface (I/F) portion 12 as interfaces for connection to an external apparatus. The I/F portion 11 and the image I/F portion 12 include connectors for wired connection, and may include interface circuits corresponding to the connectors. In addition, the I/F portion 11 and the image I/F portion 12 may include wireless communication interfaces. As the connectors and interface circuits for the wired connection, a connector or an interface circuit for the wired connection conforming to a wired LAN, IEEE1394, USE, or the like may be included. In addition, as an wireless communication interface, a connector or an interface circuit conforming to a wireless LAN, Bluetooth®, or the like may be included. In the image I/F portion 12, an interface for image data such as HDMI® interface can be used. The image I/F portion 12 may include an interface for inputting sound data.

The I/F portion 11 is an interface for transmitting and receiving various data between external apparatuses such as a PC. The I/F portion 11 inputs and outputs control data relating to image projection, setting data for setting an operation of the projector 10, coordinate data of the indication position detected by the projector 10, or the like. The control portion 30 described below has a function of transmitting and receiving data with an external apparatus through the I/F portion 11.

The image I/F portion 12 is an interface for inputting digital image data. The projector 10 according to the present embodiment projects an image based on the digital image data input through the image I/F portion 12. Further, the projector 10 may include a function of projecting an image based on the analog image signal, and in this case, the image I/F portion 12 may include an interface for an analog image and an A/D converting circuit for converting an analog image signal into digital image data.

The projector 10 includes a projecting portion 20 for forming an optical image. The projecting portion 20 includes a light source portion 21, an optical modulating device 22, and a projection optical system 23. The light source portion 21 includes a light source formed by a xenon lamp, an extra-high pressure mercury lamp, a Light Emitting Diode (LED), a laser light source, or the like. In addition, the light source portion 21 may include a reflector and an auxiliary reflector for guiding light generated by the light source to the optical modulating device 22. Additionally, a lens group (not illustrated) or a polarizing plate for enhancing an optical property of projected light, or a dimmer element for decreasing a light amount of the light generated from the light source on a path reaching the optical modulating device 22 may be included.

The optical modulating device 22 includes three transparent liquid crystal panels, for example, corresponding to three primary colors of RGB, and generates image light by modulating the light that penetrates through the liquid crystal panel. The light from the light source portion 21 is separated into colored beams of three colors of RGB, and the colored beams are incident to the respective corresponding liquid crystal panels. The colored beams that penetrate the respective liquid crystal panels and are modulated are synthesized by a synthesis optical system of a cross dichroic prism, and are emitted to the projection optical system 23.

The projection optical system 23 includes a lens group that guides image light modulated by the optical modulating device 22 in a direction of the screen SC, and forms an image on the screen SC. In addition, the projection optical system 23 includes a zoom mechanism that zooms in and out of a projection image of the screen SC, and adjusts a focal point, and a focus adjusting mechanism that adjusts a focus. When the projector 10 is a short focus type, a concave mirror that reflects image light toward the screen SC may be included in the projection optical system 23.

A light source driving portion 45 that turns on the light source portion 21 under the control of a control portion 30 and an optical modulating device driving portion 46 that operates the optical modulating device 22 under the control of the control portion 30 is connected to the projecting portion 20. The light source driving portion 45 has a function of switching the turning on and off of the light source portion 21, and adjusting a light amount of the light source portion 21.

The projector 10 includes an image processing system that processes an image projected by the projecting portion 20. The image processing system includes the control portion 30 that controls the projector 10, a storage portion 110, an operation detecting portion 17, an image processing portion 40, the light source driving portion 45, and the optical modulating device driving portion 46. In addition, a frame memory 44 is connected to the image processing portion 40, and the attitude sensor 47, the emitting device driving portion (second transmitting portion) 48, and the position detection portion 50 are connected to the control portion 30. These items may be included in the image processing system.

The control portion 30 controls respective portions of the projector 10 by executing a predetermined control program 111. The storage portion 110 stores the control program 111 executed by the control portion 30 and data processed by the control portion 30 in a non-volatile manner. The storage portion 110 stores setting screen data 115 of a screen for setting an operation of the projector 10, and the setting data 116 for indicating contents set by using the setting screen data 115. The storage portion 110 further stores an auto calibration image 121 and a manual calibration image 122. Additionally, the storage portion 110 stores an auto calibration data 123, a manual calibration data 124, an initial correction data 125, and a manual correction data 126. Details of the data are described below.

The image processing portion 40 processes image data input through the image I/F portion 12 and outputs image signals to the optical modulating device driving portion 46 under the control of the control portion 30. The processes performed by the image processing portion 40 are a process of determining a three-dimensional (3D) image and a plane (2D) image, a resolution converting process, a frame rate converting process, a distortion correction process, a digital zoom process, a color tone correction process, a brightness correction process, and the like. The image processing portion 40 executes a process designated by the control portion 30, and performs a process by using a parameter input from the control portion 30, if necessary. In addition, it is also possible to combine and execute a plurality of processes among the processes described above.

The image processing portion 40 is connected to the frame memory 44. The image processing portion 40 develops image data input from an image input I/F 12 on the frame memory 44, and executes the various processes with respect to the developed image data. The image processing portion 40 reads processed image data from the frame memory 44, generates image signals of RGB corresponding to the image data, and outputs the generated image signals to the optical modulating device driving portion 46.

The optical modulating device driving portion 46 is connected to the liquid crystal panel of the optical modulating device 22. The optical modulating device driving portion 46 drives the liquid crystal panel based on the image signals input from the image processing portion 40, and draws the image on the respective liquid crystal panels.

The operation detecting portion 17 is connected to a remote light receiving portion 18 and an operation panel 19 which function as input devices, and detects operations through the remote light receiving portion 18 and the operation panel 19.

The remote light receiving portion 18 receives an infrared signal transmitted according to a button operation by a remote controller (not illustrated) used by the user of the projector 10 by the remote light receiving portion 18. The remote light receiving portion 18 decodes the infrared signal received from the remote controller, generates operation data indicating operation contents according to the remote controller, and outputs the operation data to the control portion 30.

The operation panel 19 is provided on the exterior housing of the projector 10, and has various kinds of switches and indicator lamps. The operation detecting portion 17 appropriately turns on and off the indicator lamp of the operation panel 19 according to the operation state and the setting state of the projector 10 according to the control of the control portion 30. If the switch of the operation panel 19 is operated, the operation data according to the operated switch is output from the operation detecting portion 17 to the control portion 30.

An emitting device driving portion 48 is connected to the light emitting apparatus 60 through a connecting portion 49. The connecting portion 49 is, for example, a connector having a plurality of pins, and the light emitting apparatus 60 is connected to the connecting portion 49 through a cable 60a. The emitting device driving portion 48 generates a pulse signal according to the control of the control portion 30, and is output to the light emitting apparatus 60 through the connecting portion 49. In addition, the emitting device driving portion 48 supplies electric power to the light emitting apparatus 60 through the connecting portion 49.

The light emitting apparatus 60 accommodates the light source portion 61 and optical components in a substantially box-shaped case as illustrated in FIG. 1. The light emitting apparatus 60 according to the present embodiment includes a solid light source (not illustrated) that generates infrared light to the light source portion 61. The infrared light generated by the solid light source is diffused by a collimating lens and a Powell lens, and forms a surface along the screen SC. In addition, the light source portion 61 includes a plurality of solid light sources and may form a light layer so that the image projection scope of the screen SC is covered, by respectively diffusing light generated by the plurality of solid light sources. In addition, the light emitting apparatus 60 may include an adjustment mechanism that adjusts a distance and an angle between the light layer generated by the light source portion 61 and the screen SC.

The light emitting apparatus 60 turns on the light source portion 61 by a pulse signal and electric power supplied from the emitting device driving portion 48. The timing at which the light source portion 61 is turned on and off is controlled by the emitting device driving portion 48. The control portion 30 controls the emitting device driving portion 48, and turns on the light source portion 61 in synchronization with the timing at which an imaging portion 51 described below performs capturing.

The position detection portion 50 detects the operation of the screen SC by the indicators 70 and 80. The position detection portion 50 includes the imaging portion (imaging portion) 51, a transmitting portion (first transmitting portion) 52, a imaging control portion 53, a captured image data processing portion 56, a frame memory 58, an indicator detecting portion 54, and a coordinate calculating portion 55.

The imaging portion 51 captures an image of the screen SC and the peripheral portion (detection area) thereof as a capturing target scope in order to detect the indication positions of the indicators 70 and 80. In addition, the imaging portion 51 has an imaging optical system, an imaging element, an interface circuit, and the like, and captures the projection direction of the projection optical system 23. The imaging optical system of the imaging portion 51 is arranged toward substantially the same direction of the projection optical system 23, and has an angle of view that covers the scope in which the projection optical system 23 projects an image on the screen SC. In addition, the imaging element includes a CCD or a CMOS that receives light in an infrared region and a visible light region. The imaging portion 51 may include a filter for blocking a portion of light incident to the imaging element, and, for example, may arrange a filter for mainly transmitting light in the infrared region when the infrared light is received, before the imaging element. In addition, the interface circuit of the imaging portion 51 reads and outputs a detection value of the imaging element.

The imaging control portion 53 performs capturing by the imaging portion 51 and generates the data of the captured image. If the imaging element captures visible light, the image projected on the screen SC is captured. For example, the auto calibration image described below captures visible light. In addition, when the imaging control portion 53 can capture infrared image by the imaging portion 51, the infrared light (infrared signal) generated by the indicator 70 and the reflected light reflected by the indicator 80 are taken in the captured image at this point.

The captured image data processing portion 56 develops the captured image data captured by the imaging portion 51 and obtained from the imaging control portion 53 to the frame memory 58. The captured image data processing portion 56 stores a mask image described below, and performs a mask process by overlapping the mask image with the data of the captured image developed in the frame memory 58. The captured image data processing portion 56 outputs the data of the captured image after the mask process to the indicator detecting portion 54.

The indicator detecting portion 54 detects the indication positions of the indicators 70 and 80 by using concentration threshold values different according to the position of the screen SC based on the data of the captured image captured by the imaging control portion 53. The concentration threshold value is set to be a value different according to a distance from the imaging portion 51 to the positions on the screen SC. Specifically, the concentration threshold value is set to be greater as the distance from the imaging portion 51 becomes closer. Details of the concentration threshold value and the process of detecting indication positions of the indicators 70 and 80 from the data of the captured image by using the concentration threshold value are hereinafter described with reference to FIGS. 15A and 15B.

The indicator detecting portion 54 detects at least one of an image of the infrared light generated by the indicator 70 and an image of the reflected light reflected on the indicator 80, from the data of the captured image when the imaging control portion 53 captures the infrared light by the imaging portion 51. Additionally, the indicator detecting portion 54 may determine whether the detected image is an image of the light generated by the indicator 70 or an image of the reflected light of the indicator 80.

The coordinate calculating portion 55 calculates the coordinates of the indication positions of the indicators 70 and 80 according to the data of the captured image based on the position detected by the indicator detecting portion 54, and outputs the coordinates to the control portion 30. The coordinate calculating portion 55 may calculate the coordinates of the indication positions of the indicators 70 and 80 with respect to the projection image projected by the projecting portion 20 and output the coordinates to the control portion 30. Additionally, the coordinate calculating portion 55 may calculate the coordinates of the indication positions of the indicators 70 and 80 with respect to the image data which is drawn by the image processing portion 40 in the frame memory 44 and the coordinates of the indication positions of the indicators 70 and 80 with respect to the input image data of the image I/F portion 12.

The transmitting portion 52 transmits the infrared signal to the indicator 70 under the control of the indicator detecting portion 54. The transmitting portion 52 has a light source of an infrared LED or the like, and turns on and off the light source under the control of the indicator detecting portion 54.

In addition, the indicator 70 includes a control portion 73, the transmitting and receiving portion 74, the operating switch 75, and a power supply portion 76, and the elements are accommodated in the shaft portion 72 (FIG. 1). The control portion 73 is connected to the transmitting and receiving portion 74 and the operating switch 75, and detects the on/off state of the operating switch 75. The transmitting and receiving portion 74 includes a light source such as an infrared LED and a light receiving element that receives the infrared light, turns on and off the light source under the control of the control portion 73, and outputs the light reception state of the light receiving element to the control portion 73.

The power supply portion 76 has a battery or a secondary battery as power supply, and supplies electric power to the control portion 73, the transmitting and receiving portion 74, and the operating switch 75.

The indicator 70 may include a power supply switch that turns on and off the power supply from the power supply portion 76.

Here, a method for specifying the indicator 70 from the data of the captured image of the imaging portion 51 by the communication between the position detection portion 50 and the indicator 70 is described.

When the position indication operation is detected by the indicator 70, the control portion 30 transmits a signal for synchronization from the transmitting portion 52 by controlling the indicator detecting portion 54. That is, the indicator detecting portion 54 turns on the light source of the transmitting portion 52 in a predetermined cycle under the control of the control portion 30. The infrared light periodically generated by the transmitting portion 52 functions as a synchronization signal for synchronizing the position detection portion 50 and the indicator 70.

Meanwhile, after the supply of the electric power from the power supply portion 76 is started and a predetermined initialization operation is performed, the control portion 73 receives the infrared light generated by the transmitting portion 52 of the projector 10 by the transmitting and receiving portion 74. If the infrared light periodically generated by the transmitting portion 52 is received by the transmitting and receiving portion 74, the control portion 73 turns on (emits) the light source of the transmitting and receiving portion 74 in the preset lighting pattern in synchronization with the timing of the infrared light. The lighting pattern indicates data specific to the indicator 70, by associating the turning on and off of the light source with the ON/OFF of the data. The control portion 73 turns on and off the light source according to the set turning-on time and the set turning-off time of the pattern. The control portion 73 repeats the pattern while the electric power is supplied from the power supply portion 76.

That is, the position detection portion 50 periodically transmits the infrared signal for the synchronization to the indicator 70, and the indicator 70 transmits the preset infrared signal in synchronization with the infrared signal transmitted by the position detection portion 50.

The imaging control portion 53 of the position detection portion 50 controls the capturing timing by the imaging portion 51 in synchronization with the timing at which the indicator 70 turns on light. The capturing timing is determined based on the timing at which the indicator detecting portion 54 turns on the transmitting portion 52. The indicator detecting portion 54 can specify the pattern at which the indicator 70 is turned on according to whether the image of the light of the indicator 70 is reflected in the data of the captured image of the imaging portion 51.

The pattern for turning on the indicator 70 can be a pattern specific to each item of the indicators 70, or a pattern including a pattern common to a plurality of the indicators 70, and a pattern specific to each item of the indicators 70. In this case, when the images of the infrared light generated by the plurality of indicators 70 are included in the data of the captured image, the indicator detecting portion 54 can distinguish respective images as images of the different indicators 70.

In addition, the control portion 30 synchronizes the timing of turning on the light source portion 61 with the timing of capturing of the imaging portion 51 by controlling the emitting device driving portion 48. If the light source portion 61 is turned on by pulses in synchronization with the capturing timing of the imaging portion 51, when the indicator 80 points on the screen SC, the reflected light of the indicator 80 is reflected on the captured image of the imaging portion 51. If the light source portion 61 is turned on at a pattern that is distinctive to the timing of turning on the indicator 70, the indicator detecting portion 54 can determine whether the image reflected on the data of the captured image is the indicator 70 or the indicator 80. For example, a case of turning on the light source portion 61 in a pattern of "1010101010" (1 indicates turning on and 0 indicates turning off) by turning on the indicator 70 in synchronization with the entire capturing timing of the imaging portion 51 may be considered. In this case, the image captured when the light source portion 61 is not turned on can be determined as an image captured by the indicator 70.

Additionally, the control portion 73 included in the indicator 70 may switch the pattern for turning on the transmitting and receiving portion 74 according to the operation state of the operating switch 75. Therefore, the indicator detecting portion 54 can determine the operation state of the indicator 70 based on the plurality of the data of the captured image, that is, whether the tip portion 71 is pressed on the screen SC.

An attitude sensor 47 is formed by an acceleration sensor, a gyro sensor, or the like, and outputs a detection value to the control portion 30. The attitude sensor 47 is fixed to the main body of the projector 10 in a manner so as to be capable of identifying the installation direction of the projector 10.

The projector 10 can be used in an installation state of performing projection from a lower side of the screen SC, and in an installation state of using a horizontal surface such as the upper surface of a desk as the screen SC in addition to the suspension installation of being suspended from the surface of a wall or a ceiling as illustrated in FIG. 1. There may be an installation state of the projector 10 which is not suitable for the usage of the light emitting apparatus 60. For example, when the projection is performed on the screen SC from the lower side, the body of the user may block the emission light of the light emitting apparatus 60. Therefore, the installation is inappropriate. The attitude sensor 47 is installed on the main body of the projector 10 so as to identify the plurality of installation states assumed as the installation states of the projector 10. The attitude sensor 47 may be formed by using, for example, a dual axis gyro sensor, a single axis gyro sensor, or an acceleration sensor. The control portion 30 can automatically determine the installation state of the projector 10 based on the output value of the attitude sensor 47. When the control portion 30 is determined to be in an installation state which is inappropriate for the usage of the light emitting apparatus 60, for example, the emitting device driving portion 48 stops an output of the power supply voltage or the pulse signal.

The control portion 30 realizes functions of a projection control portion 31, a detection control portion 32, an emission control portion 33, and a calibration control portion 39 (mask image generating portion) by reading and executing the control program 111 recorded in the storage portion 110, and controls respective elements of the projector 10.

The projection control portion 31 acquires the operation contents performed by the user based on the operation data input from the operation detecting portion 17. The projection control portion 31 controls the image processing portion 40, the light source driving portion 45, and the optical modulating device driving portion 46 under the operation of the user, and causes the image to be projected on the screen SC. The projection control portion 31 controls the image processing portion 40, and executes the determination process of a three-dimensional (3D) image and a plane (2D) image as described above, a resolution converting process, a frame rate converting process, a distortion correction process, a digital zoom process, a color tone correction process, a brightness correction process, and the like. In addition, the projection control portion 31 controls the light source driving portion 45 in combination with the process of the image processing portion 40, and controls the light amount of the light source portion 21.

The detection control portion 32 controls the position detection portion 50, detects the operation positions of the indicators 70 and 80, and acquires the coordinates of the operation positions. In addition, the detection control portion 32 acquires data for identifying whether the detected operation position is an operation position of the indicator 70 or an operation position of the indicator 80, and data for indicating an operation state of the operating switch 75 together with the coordinates of the operation positions. The detection control portion 32 executes the preset process based on the acquired coordinates and data. For example, the detection control portion 32 executes a process of causing the image processing portion 40 to draw a diagram based on the acquired coordinates and superimposing and projecting the drawn diagram with an input image input to the image I/F portion 12. In addition, the detection control portion 32 may output the acquired coordinates to an external apparatus such as a PC connected to the I/F portion 11. In this case, the detection control portion 32 may convert the acquired coordinates into a data format identified as an input of a coordinate input device in an operating system of an external apparatus connected to the I/F portion 11 to output. For example, when a PC that operates in the Windows® operating system is connected to the I/F portion 11, data processed as input data of a Human Interface Device (HID) in the operating system is output. In addition, the detection control portion 32 may output data for determining whether an operation position is the operation position of the indicator 70 or the operation position of the indicator 80, and data for indicating the operation state of the operating switch 75 together with the coordinate data.

In addition, the detection control portion 32 controls the position detection using the indicator 80. Specifically, the detection control portion 32 determines whether the light emitting apparatus 60 can be used or not, based on the connection or the non-connection of the light emitting apparatus 60. When the light emitting apparatus 60 cannot be used, the detection control portion 32 performs setting so that the light emitting apparatus 60 cannot be used. Here, the detection control portion 32 may report that the light emitting apparatus 60 cannot be used.

The emission control portion 33 executes or stops the output of the power supply and the pulse signal to the light emitting apparatus 60 connected to the connecting portion 49 by controlling the emitting device driving portion 48. When the light emitting apparatus 60 may not be used or is not used, the emission control portion 33 stops the output of the power supply and the pulse signal of the emitting device driving portion 48 under the control of the detection control portion 32. In addition, when using the light emitting apparatus 60, the emission control portion 33 outputs the power supply and the pulse signal of the emitting device driving portion 48.

The calibration control portion 39 detects the indication positions of the indicator 70 and the indicator 80, and executes a calibration for converting the indication positions into the coordinates in the input image of the image I/F portion 12.

A process sequence of the control portion 30, especially, a process sequence of the calibration control portion 39 is described with reference to the flow chart of FIG. 3 and the accompanying drawings.

The calibration is executed as one of the initial settings when the projector 10 is initially used. For example, the calibration is a process of associating the position in the image which is drawn in the frame memory 44 and projected by the projecting portion 20 and the position on the data of the captured image captured by the imaging portion 51. The indication positions of the indicators 70 and 80 detected by the position detection portion 50 from the data of the captured image are positions in the data of the captured image, and are indicated by, for example, the coordinates in the coordinate system set in the captured image. The user is aware of the projection image projected on the screen SC, and performs indication with the indicators 70 and 80. Accordingly, the projector 10 is required to specify the indication position in the projection image on the screen SC. The coordinates of the positions detected with the data of the captured image can be converted into the coordinates on the projection image data by the calibration. The data that performs the association is set to be the calibration data. The calibration data is data for associating the coordinates on the data of the captured image output by the imaging control portion 53 with the coordinates on the projection image. Specifically, the calibration data may be a table in which the coordinates on the data of the captured image and the coordinates on the projection image are associated one by one, and may be a function for converting the coordinates on the data of the captured image into the coordinates on the projection image.

The calibration control portion 39 may execute the calibration corresponding to the kinds of the indicators. That is, the calibration control portion 39 executes two kinds of calibrations: a calibration relating to the detection of the indication position of the indicator 70 and a calibration relating to the detection of the indication position of the indicator 80.

Figure 4A:
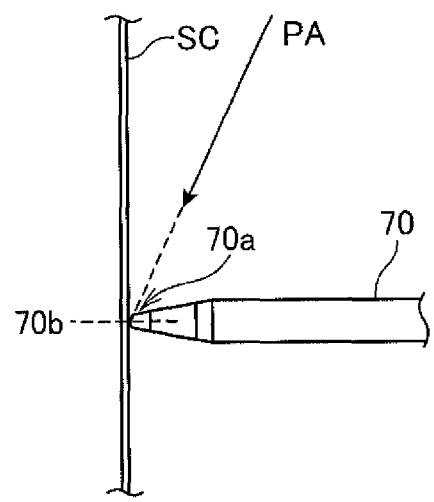
FIG. 4A illustrates a state of detecting an indication position of a pen-type indicator.
Figure 4B:
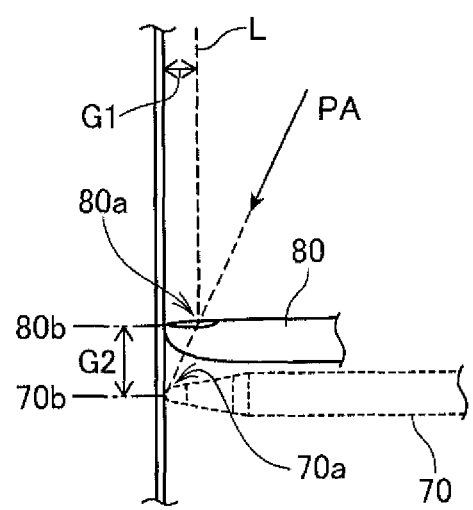
FIG. 4B illustrates a state of detecting the indication position of a finger as the indicator.

FIGS. 4A and 4B are explanatory diagrams illustrating a state of detecting the indication positions of the indicators 70 and 80, FIG. 4A illustrates a state of detecting the indication position of the indicator 70, and FIG. 4B illustrates a state of detecting the indication position of the indicator 80.

In FIG. 4A, the capturing direction in which the imaging portion 51 captures an image of the screen SC is indicated with a reference numeral PA. When the position detection of the indicator 70 is performed, the transmitting and receiving portion 74 emits the infrared light from a light emitting position 70a at the tip of the indicator 70. The light emitting position 70a is extremely close to a contacting point 70b at which the indicator 70 is in contact with the screen SC. Therefore, when an image of the light generated by the indicator 70 from the data of the captured image captured in the capturing direction PA is detected, the position of the image may be assumed to be the position of the contacting point 70b.

Accordingly, when the indication position of the indicator 80 is detected as illustrated in FIG. 4B, the reflected light obtained from the indicator 80 by reflecting detection light L that the light emitting apparatus 60 emits is detected. That is, the image of the reflected light of the detection light L is detected from the data of the captured image captured in the capturing direction PA. The emission direction of the detection light L is substantially parallel to the screen SC, and the detection light L is separated from the screen SC by a predetermined distance (hereinafter, referred to as a distance G1). The distance G1 changes according to the installation position of the light emitting apparatus 60 with respect to the screen SC, but it is difficult to set the distance G1 to be zero due to the structure. Therefore, the image of the reflected light reflected on the tip of the indicator 80 to a reflection position 80a separated from the screen SC by the distance G1 is taken on the data of the captured image captured in the capturing direction PA.

As illustrated in FIG. 4B, the reflection position 80a is separated in an oblique direction with respect to the capturing direction PA. Therefore, the position of the image of the reflected light which is taken in the data of the captured image becomes the same position as the image when a farther position is indicated by the indicator 70 in the capturing direction PA. That is, the reflected light when the indicator 80 is in contact with the screen SC at a contacting point 80b and the light when the indicator 70 is in contact with the screen SC at the contacting point 70b are taken at the same position in the data of the captured image of the imaging portion 51. Therefore, the contacting point 80b pointed by the indicator 80 is detected as the contacting point 70b separated from the imaging portion 51 in the capturing direction PA to be deviated by a distance G2.

The deviation of the distance G2 is caused because the imaging portion 51 obliquely performs capturing from the position separated from the screen SC. For example, the positional relationship between the capturing direction PA and the indicators 70 and 80 illustrated in FIGS. 4A and 4B is not limited to the vertical direction, but is generated in the same manner in the horizontal direction. According to the present embodiment, since one imaging portion 51 provided on the main body of the projector 10 positioned over the screen SC illustrated in FIG. 1 overlooks the screen SC and performs capturing, the deviation of the distance G2 is generated in both the vertical and horizontal directions.

At this point, when the projector 10 detects the indication position of the indicator 80, after the indication position is detected in the same manner as the indication position of the indicator 70 is detected, the detected position is corrected.

Specifically, the calibration control portion 39 generates the calibration data by performing calibration relating to the detection of the indication position of the indicator 70. If the calibration data is used, for example, as illustrated in FIG. 4A, when the light emitting position 70a is close to the contacting point 70b with the screen SC, the indication position can be highly accurately detected.

Additionally, when the projector 10 detects the indication position of the indicator 80, the correction data for correcting coordinates calculated by the calibration data is used. The correction data is the initial correction data 125 and the manual correction data 126, specifically.

The correction data can be data for determining the distance G1 of FIG. 4B. In this case, the correction data may be in a table format or map data in which each of the coordinates on the data of the captured image or each of the coordinates on the projection image is associated with the data indicating the length of the distance G1. In addition, the correction data may be in a table format in which a representative point in the coordinates on the data of the captured image or in the coordinates on the projection image is associated with the data indicating the length of the distance G1. When a length of the distance G1 of the coordinates deviated from the representative point is required to be calculated, a method of applying the distance G1 of the representative point close to correction target coordinates or a method of calculating the distance G1 of the correction target coordinates from the distance G1 of the representative point by interpolation calculation can be used.

In addition, for example, the correction data may be data for shifting the coordinates detected on the data of the captured image or the coordinates on the projection image obtained based on the calibration data. Specifically, the correction data may be data for determining a shift amount of the coordinates or may be a function for correcting the coordinates. In addition, the correction data may be data for realizing different shift amounts for each of the coordinates on the data of the captured image or the coordinates on the projection image. In this case, the correction data may be a table in which shift amounts of the coordinates are associated with the correction target coordinates. The table may be obtained by associating the shift amount with the representative point selected from the coordinates on the data of the captured image or the coordinates on the projection image. When coordinates other than the representative point is corrected, a method of applying a shift amount of the representative point near the correction target coordinates or a method of calculating the shift amount of the correction target coordinates from the shift amount of the representative point by the interpolation calculation can be used.

The calibration control portion 39 can execute the auto calibration and the manual calibration as calibrations relating to the indication position of the indicator 70.

The auto calibration is a process of projecting an image for the auto calibration on the screen SC, capturing the image with the imaging portion 51, and generating calibration data by using the data of the captured image. The auto calibration is a process that can be automatically executed by the projector 10, and does not require the operation of the indicators 70 and 80 by the user. The auto calibration is not limited to a case in which the user instructs the execution with the remote controller or the operation panel 19, and may be executed at the timing controlled by the control portion 30. For example, the auto calibration may be performed at the time of starting an operation right after the electric power of the projector 10 is turned on, or may be performed during the normal operation described below. The auto calibration image 121 projected by the auto calibration is stored in the storage portion 110 in advance.

Figure 5:
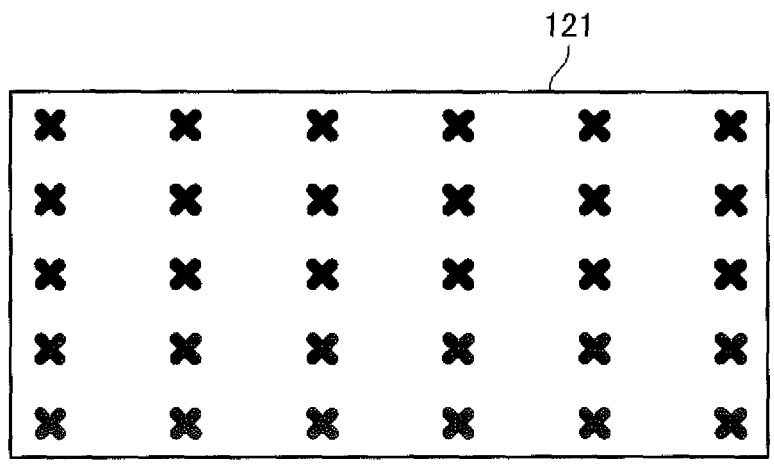
FIG. 5 is a diagram illustrating an example of an auto calibration image.

FIG. 5 is an example of the auto calibration image 121. A plurality of marks (symbols) are arranged in the auto calibration image 121 at a predetermined interval. The mark in the calibration image is a diagram or a symbol that can be detected from the data of the captured image, and the shape or the size is not particularly limited.

Figure 6:
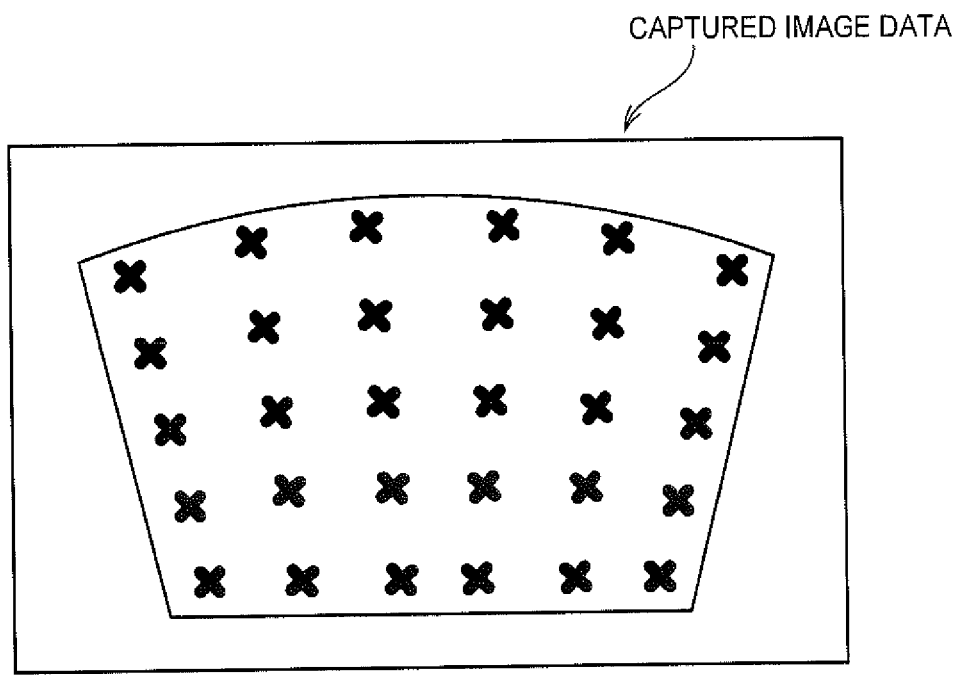
FIG. 6 is a diagram illustrating an example of data of a captured image captured by an imaging portion.

FIG. 6 is a diagram illustrating an example of the data of the captured image obtained by capturing the auto calibration image 121 projected on the screen SC by the imaging portion 51. When the projector 10 is installed in a suspending manner as illustrated in FIG. 1, the data of the captured image of the imaging portion 51 is captured from the obliquely upper side of the screen SC, so the image becomes distorted. FIG. 5 illustrates an example of the rectangular auto calibration image 121 in which marks are lined up at even intervals, but an image having a distorted shape is taken in the data of the captured image of FIG. 6, and the intervals of the lined-up marks inside the image are different according to the positions of the marks.

The calibration control portion 39 operates the image processing portion 40 and the projecting portion 20 based on the auto calibration image 121 stored in the storage portion 110 by the function of the projection control portion 31, and projects the auto calibration image 121 on the screen SC. The calibration control portion 39 obtains the data of the captured image by controlling the position detection portion 50 and causing the imaging portion 51 to capture an image. The data of the captured image is temporarily stored in a memory (not illustrated) from the imaging control portion 53, and is output to the control portion 30. The calibration control portion 39 detects the mark from the data of the captured image, and acquires the centroid positions of the respective marks as coordinate values of the marks. The calibration control portion 39 associates the mark detected from the data of the captured image with the projection image drawn in the frame memory 44, that is, the mark of the auto calibration image 121.

The calibration control portion 39 creates the auto calibration data 123 in a table format or a function format by associating the coordinate values of the marks in the captured image and the coordinate values of the marks in the projection image. The coordinate values of the marks of the auto calibration image 121 in the projection image are stored in advance in the storage portion 110 together with the auto calibration image 121, or are included in the auto calibration image 121 to be stored in the storage portion 110 in advance. When the auto calibration data 123 is already stored, the calibration control portion 39 updates the auto calibration data 123.

FIG. 7 is a diagram illustrating an example of a calibration data managing table in which the calibration data is registered. The calibration data managing table illustrated in FIG. 7 is a table in which identification numbers of the marks arranged on the auto calibration image 121 and the central coordinates of the respective marks on the auto calibration image 121 are associated with each other and recorded. The calibration data managing table is stored in the storage portion 110 in association with the auto calibration image 121. The central coordinates on the frame memory 44 of the respective marks are recorded in the calibration managing table in association with the identification numbers of the respective marks. Further, coordinate values (the maximum value and the minimum value in the X-coordinates and the Y-coordinates) in the scope in which the respective marks are positioned may be stored in switch of the central coordinates, as the position coordinates of the respective marks. Based on the coordinates registered in the calibration data managing table and the coordinates detected from the data of the captured image by the position detection portion 50, the coordinates on the data of the captured image and the coordinates on the frame memory 44 are associated with each other, and the auto calibration data 123 is generated.

The calibration control portion 39 executes the calibration one time to create or update the auto calibration data 123. Otherwise, the calibration control portion 39 substitutes the auto calibration image 121, and performs the association of coordinates with a plurality of images. Then, the calibration control portion 39 may combine association results obtained by the plurality of auto calibrations, and may create the highly accurate auto calibration data 123.

According to the present embodiment, the plurality of auto calibration images 121 are stored in the storage portion 110. The calibration control portion 39 selects one auto calibration image 121 from the auto calibration images 121 stored in the storage portion 110. It is possible to enhance the detection accuracy of the indication coordinates by the indicators 70 and 80 by preparing the plurality of auto calibration image 121 and performing the auto calibration a plurality of times. For example, images in which positions of marks in the first and second auto calibrations are different are used. In order to enhance the detection accuracy of the indication coordinates by the indicators 70 and 80, a certain size (dimension) is required in the mark. Therefore, it is possible to enhance the detection accuracy of the indication coordinates by the indicators 70 and 80 by using an image in which the auto calibration is performed twice, and further the mark positions on the auto calibration image 121 are different. In addition, the calibration control portion 39 may use the plurality of auto calibration images 121 in one auto calibration. Further, FIG. 5 illustrates a diagram illustrating an example in which an X-shaped mark is used, but the shape of the mark, the size of the mark, the number of marks included in the auto calibration image 121, and the arrangement of the marks are not limited, either.

The manual calibration is a process of projecting an image for the manual calibration on the screen SC, detecting the operation of the indicator 70 corresponding to the projected image, and generating the manual calibration data.

Figure 8:
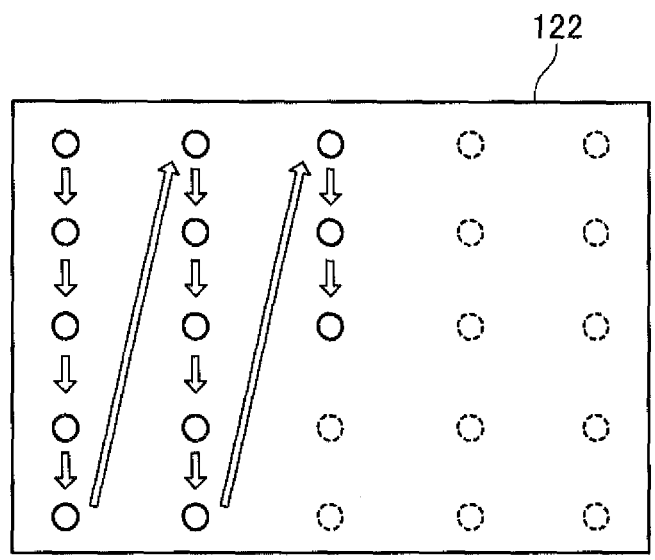
FIG. 8 is a diagram illustrating an example of a manual calibration image.

FIG. 8 is a diagram illustrating an example of the manual calibration image 122. The manual calibration image 122 includes a mark showing the indication position in order to cause the user to perform indication with the indicator 70. In the manual calibration image 122 of FIG. 8, a plurality of indication marks (o) are arranged, and the user indicates the positions of the marks with the indicator 70.

The plurality of marks are included in the manual calibration image 122, but the marks are projected on the screen SC one by one. Therefore, the manual calibration image 122 is specifically formed with the combination of the plurality of images having the different number of marks.

Every time marks are displayed on the screen SC, the user indicates a newly displayed mark with the indicator 70. The calibration control portion 39 detects the indication position every time the user performs the operation. Then, the calibration control portion 39 associates the indication positions detected in the captured image and the projection images drawn in the frame memory 44, that is, the marks of the manual calibration image 122. The calibration control portion 39 creates the manual calibration data 124 by associating the coordinate values of the indication positions detected with the data of the captured image and the coordinate values of the marks on the projection image.

The manual calibration data 124 may be formed in the same data format with the auto calibration data 123, but can be set to be the correction data for correcting the auto calibration data 123. The auto calibration data 123 is data for converting the coordinates on the captured image into the coordinates on the projection image. On the contrary, the manual calibration data 124 is the data for further correcting the coordinates after the conversion by using the auto calibration data 123.

When the calibration relating to the detection of the indication positions of the indicator 70 is performed, the calibration control portion 39 can execute the auto calibration or the manual calibration. When the storage portion 110 stores the auto calibration data 123 generated in the past, the auto calibration and the manual calibration can be selectively executed. Here, when the auto calibration is executed, the calibration control portion 39 updates the auto calibration data 123 of the storage portion 110. In addition, when the manual calibration is executed, the manual calibration data 124 is generated or updated. In addition, when the auto calibration data 123 is not stored in the storage portion 110, it is required to execute the auto calibration. It is because the manual calibration data 124 may not be used when the auto calibration data 123 is not stored.

The calibration control portion 39 can execute the calibration relating to the detection of the indication position of the indicator 80 in the same manner as the manual calibration of the indicator 70. In this case, the calibration control portion 39 generates the manual correction data 126. The manual correction data 126 is used when the indication position of the indicator 80 is detected.

The manual correction data 126 is the data for correcting the coordinates detected as the indication position of the indicator 70 into the coordinates of the indication position of the indicator 80 as described above with reference to FIG. 4B. The calibration control portion 39 selects the initial correction data 125 when the manual calibration is not performed in the detection of the indication position of the indicator 80. The initial correction data 125 is correction data in which the distance G1 of FIG. 4B is set to be the initial value and stored in the storage portion 110 in advance. The distance G1 between the screen SC and the detection light L is adjusted to be, for example, 1 mm to 10 mm at the time of installing the light emitting apparatus 60, and actually changes in the plane of the screen SC. The initial correction data 125 is the correction data in the case in which the initial value of the distance G1 is assumed to be 5 mm, and if the initial correction data 125 is used, the indication position of the indicator 80 can be detected without using manual calibration. If the manual correction data 126 created in the manual calibration is used, the indication position of the indicator 80 can be more accurately detected by performing the correction in which the difference in the plane of the distance G1 is reflected.

That is, with respect to the position detection of the position detection portion 50, when the detection control portion 32 detects the indication position of the indicator 70, the coordinates of the indication position is calculated by using the auto calibration data 123 or the manual calibration data 124. When the indication position of the indicator 80 is detected, the detection control portion 32 corrects the initial correction data 125 or the manual correction data 126 in the process of calculating coordinates by using the auto calibration data 123 or the manual calibration data 124. In other words, the initial correction data 125 and the manual correction data 126 are data of the difference for obtaining the indication position of the indicator 80 from the indication position of the indicator 70.

Figure 3:
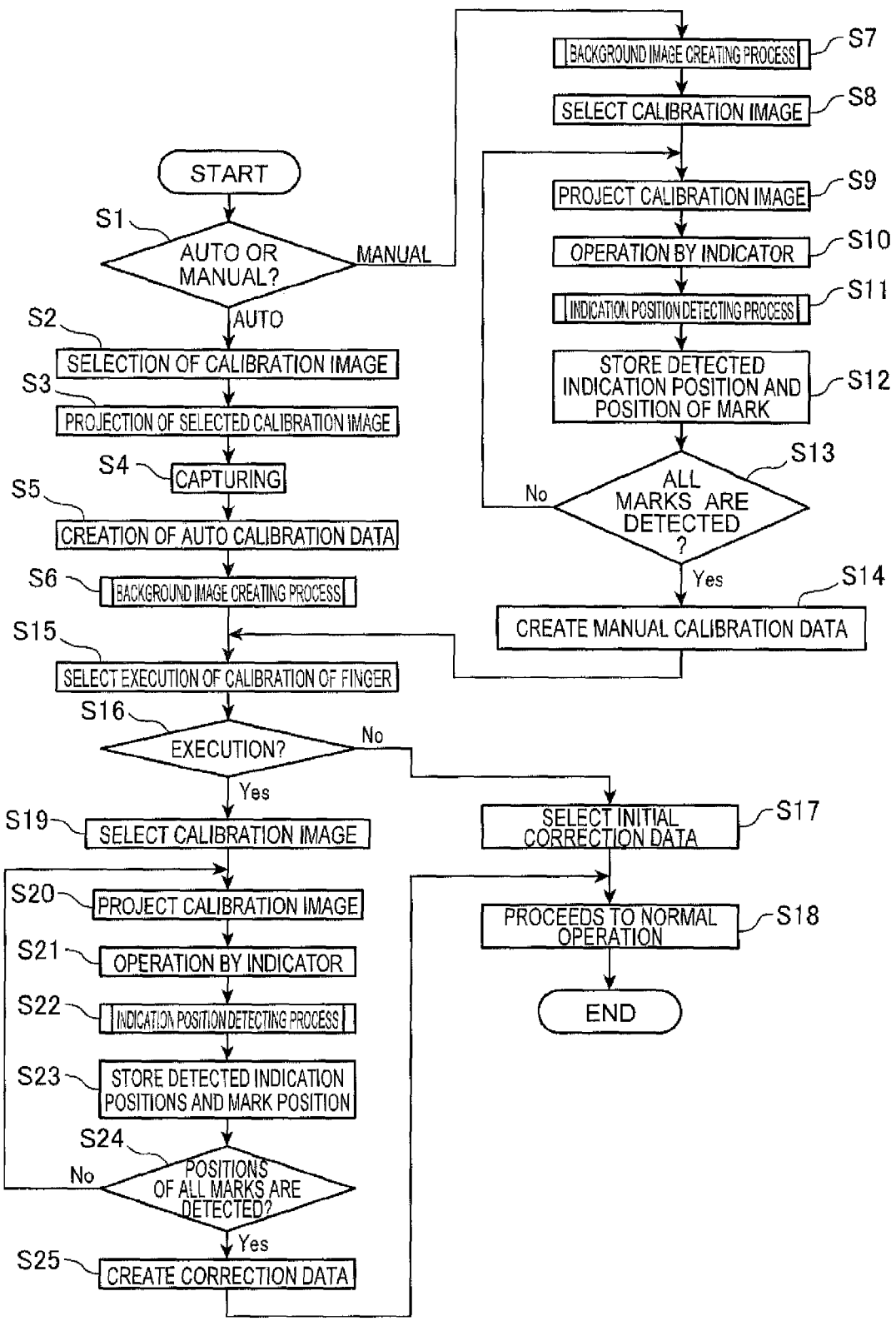
FIG. 3 is a flow chart illustrating an operation of a projector.

In the flow chart of FIG. 3, the selection of whether to execute the auto calibration or to execute the manual calibration is performed by the user (Step S1). The calibration control portion 39 detects the operation of the remote controller or the operation panel 19 (Step S2), the process proceeds to Step S2 when the auto calibration is selected, and the process proceeds to Step S7 when the manual calibration is selected. Further, as described above, when the auto calibration data 123 is not stored in the storage portion 110, a menu screen in which only the auto calibration can be selected can be projected in Step S1.

In Step S2, the calibration control portion 39 selects the auto calibration image 121. Since the plurality of auto calibration images 121 are stored in the storage portion 110, the calibration control portion 39 selects one auto calibration image 121 among the auto calibration images 121 stored in the storage portion 110.

Subsequently, the calibration control portion 39 projects the selected auto calibration image 121 on the screen SC by the projecting portion 20 (Step S3). When the auto calibration image 121 is projected on the screen SC, the user may adjust the display size and the display position by the operation of the remote controller or the operation panel 19 so that the auto calibration image 121 is settled in the display area of the screen SC.

The calibration control portion 39 causes the imaging portion 51 to perform capturing by controlling the position detection portion 50 (Step S4), and creates the auto calibration data 123 based on the obtained data of the captured image by obtaining the data of the captured image of the imaging portion 51 (Step S5).

The calibration control portion 39 executes a background image creating process (Step S6), and the process proceeds to Step S15.

Figure 9:
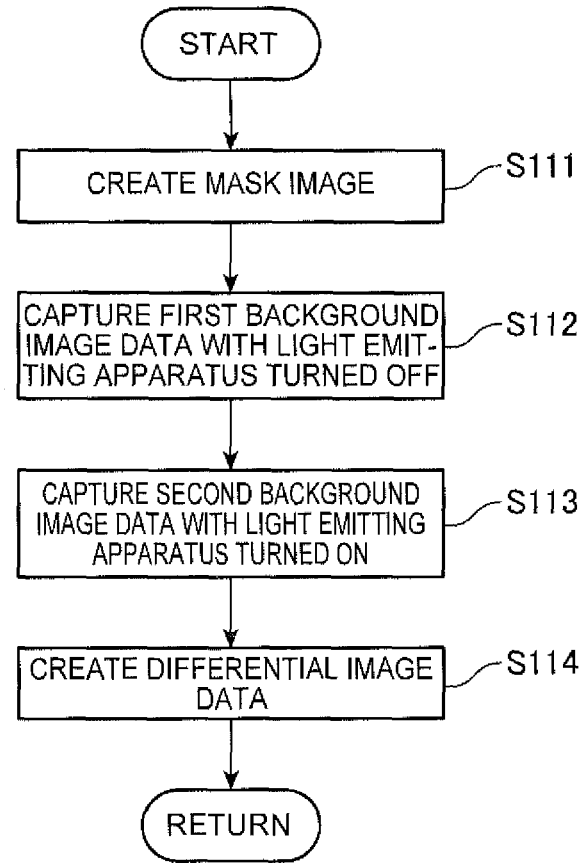
FIG. 9 is a flow chart illustrating details of a background image creating process.

FIG. 9 is a flow chart illustrating details of the background image creating process.

Figure 10:
FIG. 10 is a diagram illustrating an example of a mask image.

The calibration control portion 39 creates the mask image (Step S111). The mask image is the image for cutting the image data of the portion corresponding to the display area of the screen SC from the data of the captured image captured by the imaging portion 51. FIG. 10 is a diagram illustrating an example of the mask image.

Figure 11:
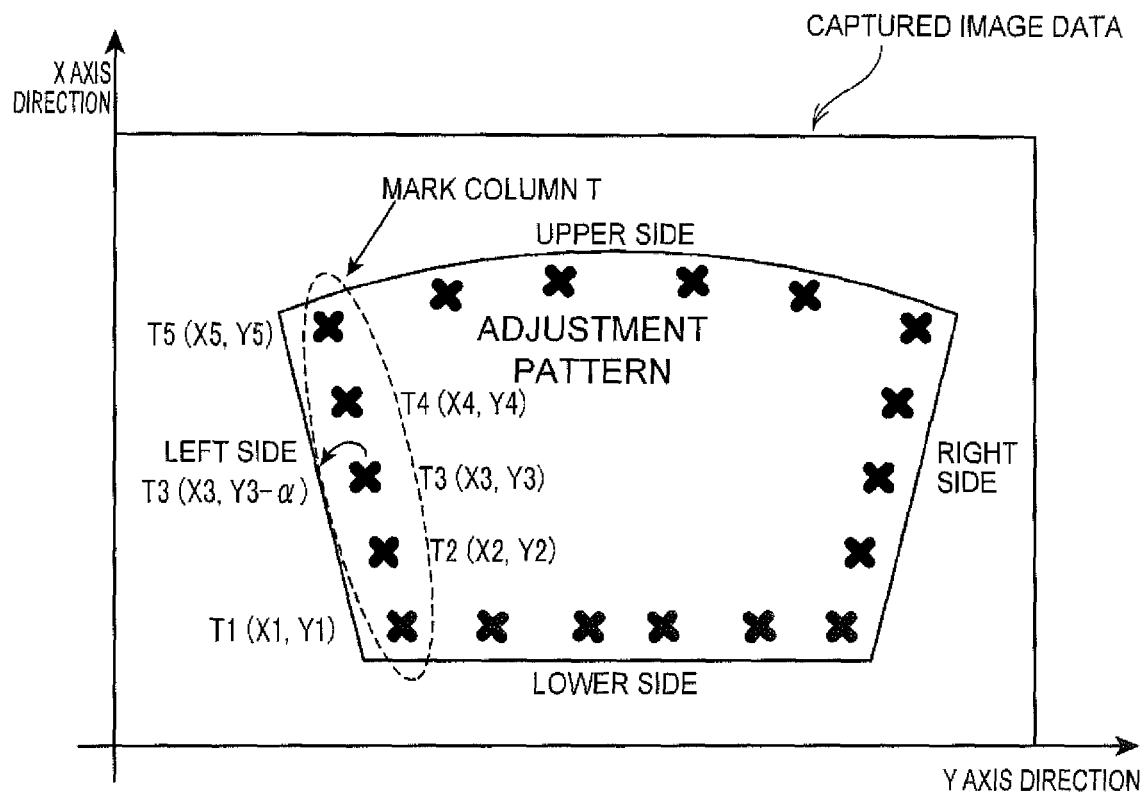
FIG. 11 is a diagram illustrating a method of creating the mask image.

A method of creating the mask image is described with reference to FIG. 11. FIG. 11 is a diagram illustrating an example of the data of the captured image. In FIG. 11, a lower left portion of the data of the captured image is set to be the origin so that the vertical direction is set to be the X axis direction and the horizontal direction is set to be the Y axis direction.

The calibration control portion 39 determines the scope in which the screen SC is taken, from the data of the captured image obtained by capturing the projection image of the screen SC.

In the projector 10, already in Step S3, the projection image is adjusted by the user so as to be settled in the projection area of the screen SC. In addition, the calibration control portion 39 obtains the data showing which of the marks included in the auto calibration image 121 are the mark columns positioned on the outermost sides in upper, lower, left, and right directions. The data is stored in the storage portion 110 in association with, for example, the auto calibration image 121.

In the example illustrated in FIG. 11, the mark column positioned on the outermost side on the left side of the auto calibration image 121 is a mark column T. The calibration control portion 39 obtains the central coordinates of the respective marks included in the mark column T from the calibration data managing table illustrated in FIG. 7. The calibration control portion 39 determines the left end of the screen SC by adding a specified value that becomes the margin in the obtained central coordinates of the respective marks. Since the mark column T is the mark column positioned on the outermost side on the left side of the auto calibration image 121, the specified value is subtracted from the Y-coordinate value of the respective marks to obtain the coordinate value on the left end of the screen SC. For example, in the case of a mark T3 (X3, Y3) of the mark column T illustrated in FIG. 11, the coordinates T3' (X3, Y3-α) obtained by subtracting a specified value α from a Y-coordinate value Y3 becomes the left end of the screen SC in T3. The calibration control portion 39 obtains coordinate values of the end portions in the upper, lower, left, and right directions of the screen SC. Further, with respect to the area in which the mark does not exist, the coordinate values of the end portions may be obtained by the supplementary process. The calibration control portion 39 stores the obtained coordinate values in the upper, lower, left, and right directions in the storage portion 110. Next, the calibration control portion 39 creates the mask image by using the obtained data in the scope of the screen SC. The calibration control portion 39 generates the mask image which sets a pixel value to be 0 in the area outside the scope of the screen SC. The calibration control portion 39 sends the generated mask image to the captured image data processing portion 56 of the position detection portion 50.

Figure 12:
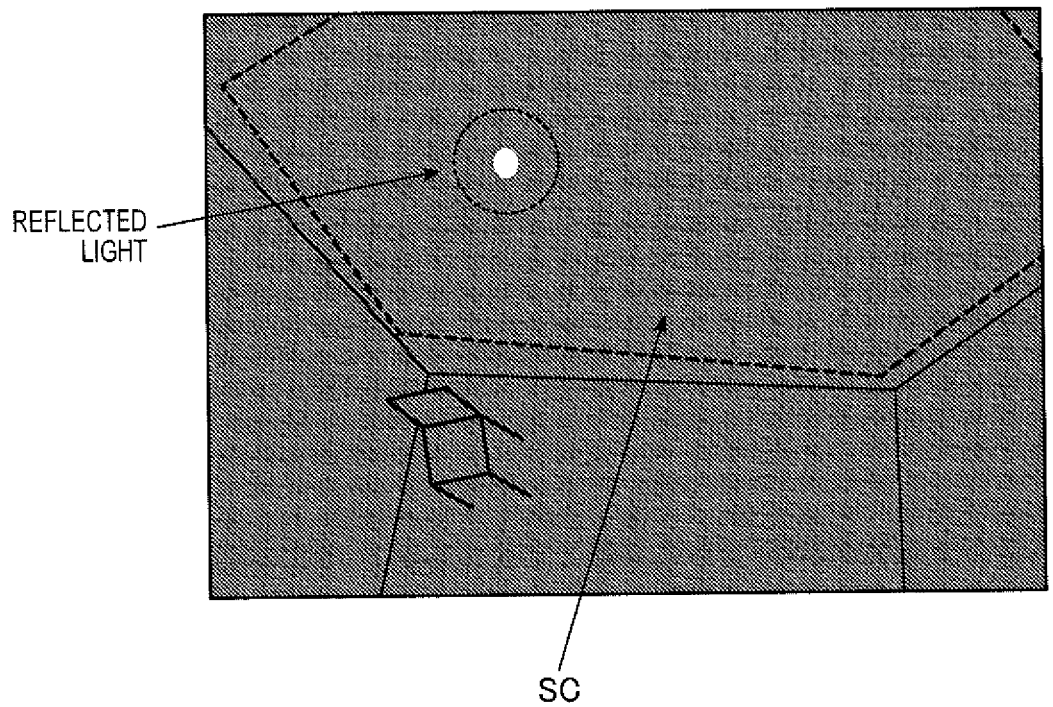
FIG. 12 is a diagram illustrating an example of data of a first background image.

Next, the calibration control portion 39 causes the imaging portion 51 to capture the capturing scope by turning off the light source portion 61 of the light emitting apparatus 60 (Step S112). When the capturing is performed by the imaging portion 51, the calibration control portion 39 causes the projecting portion 20 to project, for example, a message image that draws an attention not to operate the indicators 70 and 80 so that the indicators 70 and 80 or the user is not captured. The data of the captured image captured in Step S112 while the light source portion 61 of the light emitting apparatus 60 is turned off is called the first background image data. FIG. 12 is a diagram illustrating an example of the first background image data. In the first background image data illustrated in FIG. 12, the screen SC or the reflected light which is unintentionally taken in the screen SC is stored. The calibration control portion 39 stores the first background image data in the storage portion 110.

Figure 13:
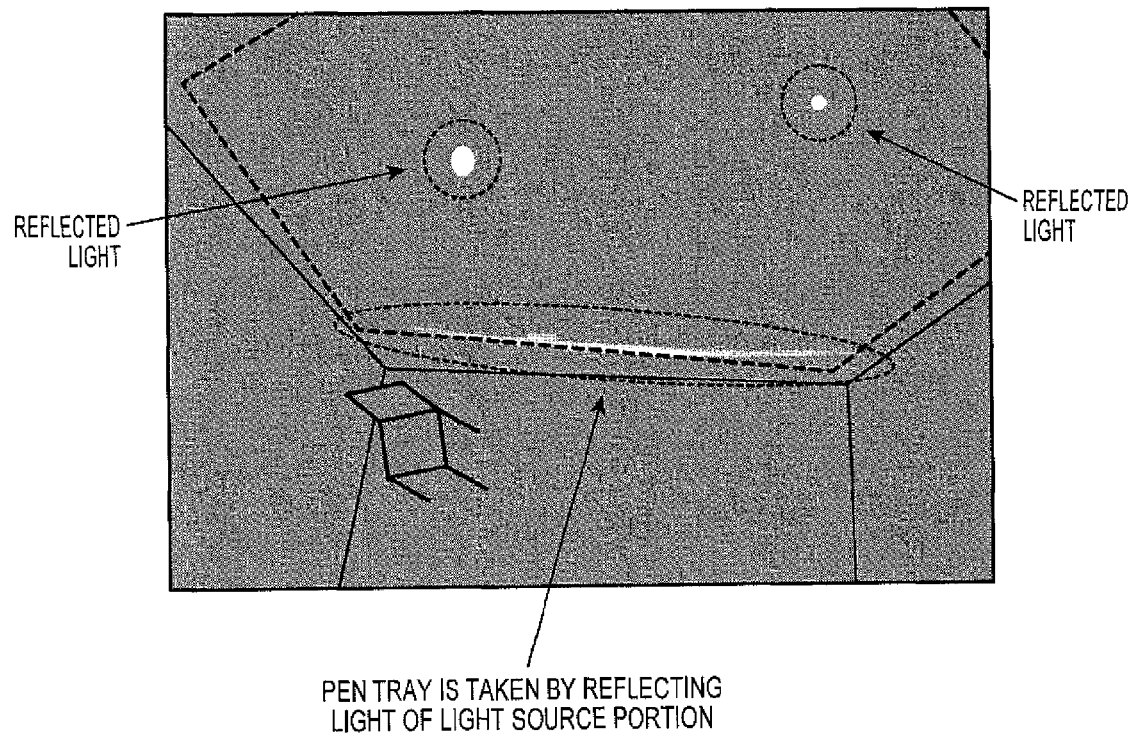
FIG. 13 is a diagram illustrating an example of data of a second background image.

Next, the calibration control portion 39 causes the imaging portion 51 to capture the capturing scope by turning on the light source portion 61 of the light emitting apparatus 60 (Step S113). When performing the capturing, the calibration control portion 39, for example, causes the message image to be projected on the projecting portion 20 so that the indicators 70 and 80 or the user is not captured. The data of the captured image captured in Step S113 while the light source portion 61 of the light emitting apparatus 60 is turned on is called the second background image data. FIG. 13 is a diagram illustrating an example of the second background image data. A pen tray that reflects the light of the light source portion 61 is taken in the second background image data illustrated in FIG. 13, in addition to the screen SC and the reflected light reflected on the screen SC by the detection light of the light emitting apparatus 60. The calibration control portion 39 stores the second background image data in the storage portion 110.

Next, the calibration control portion 39 causes the imaging portion 51 to capture the capturing scope by turning on the light source portion 61 of the light emitting apparatus 60 (Step S113). When performing the capturing, the calibration control portion 39, for example, causes the message image to be projected on the projecting portion 20 so that the indicators 70 and 80 or the user is not captured. The data of the captured image captured in Step S113 while the light source portion 61 of the light emitting apparatus 60 is turned on is called the second background image data. FIG. 13 is a diagram illustrating an example of the second background image data. A pen tray that reflects the light of the light source portion 61 is taken in the second background image data illustrated in FIG. 13, in addition to the screen SC and the reflected light reflected on the screen SC by the detection light of the light emitting apparatus 60. The calibration control portion 39 stores the second background image data in the storage portion 110.

When the first background image data and the second background image data are captured, the calibration control portion 39 subtracts the first background image data from the second background image data, and generates differential image data (Step S114). Hereinafter, the differential image data is called light source noise data. The calibration control portion 39 stores the generated light source noise data in the storage portion 110. The first background image data and the second background image data may be captured during a normal operation described below.

Meanwhile, when the manual calibration is selected, the calibration control portion 39 proceeds to Step S7.

In Step S7, the background image creating process of Step S6 described above is executed. In Step S111 of FIG. 9, the mask image is created by projecting the auto calibration image 121 on the screen SC, but the same process is performed in Step 7.

After the mask image is created, the calibration control portion 39 selects the manual calibration image 122 (Step S8), and projects the selected manual calibration image 122 on the screen SC by the projecting portion 20 (Step 39). When the manual calibration image 122 is projected on the screen SC, the user may adjust the display size and the display position so that the manual calibration image 122 is settled in the display area of the screen SC.

Here, an operation of using the indicator 70 is performed by the user (Step S10). As illustrated in FIG. 8, the predetermined marks are arranged in the manual calibration image 122. If the manual calibration image 122 is displayed on the screen SC, the user points to the marks projected on the screen SC one by one by using the indicator 70. The transmitting portion 52 of the projector 10 periodically transmits infrared signals for synchronization. The indicator 70 turns on the infrared light in synchronization with the infrared signal. The calibration control portion 39 causes the imaging portion 51 to capture the capturing scope in synchronization with the light emission timing of the indicator 70. Accordingly, the data of the captured image (hereinafter, referred to as "first position detection image data") in which the indicator 70 points the marks is captured. The calibration control portion 39 executes an indication position detecting process for detecting the indication position of the indicator 70 by obtaining the data of the captured image (Step S11).

Figure 14:
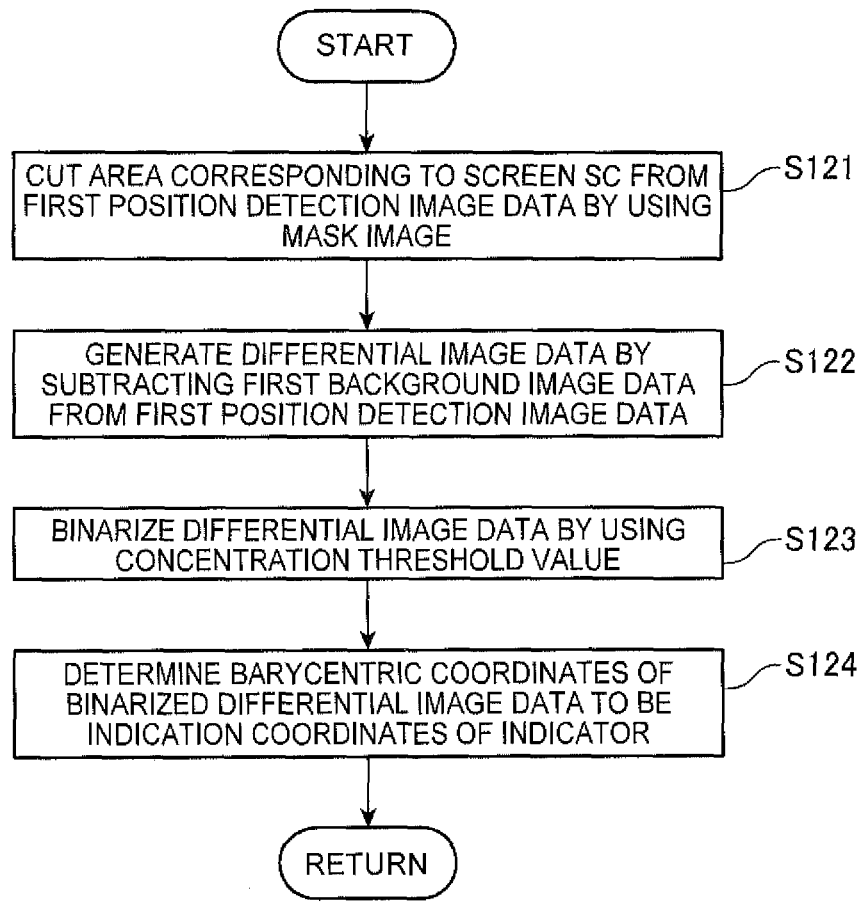
FIG. 14 is a flow chart illustrating details of an indication position detecting process.

Details of Step S11 are described with respect to the flow chart illustrated in FIG. 14. The first background image data is an image of the screen SC and the circumference thereof which is captured so that the indicator 70 and the user are not reflected by turning off the light source portion 61 of the light emitting apparatus 60. The disturbance caused by the external light entering from a window, the light of the illumination such as a fluorescent light, and the reflected light which is an external light or the light of the illumination reflected to the screen SC are recorded in the first background image data. These are called background noises.

Figure 15A:
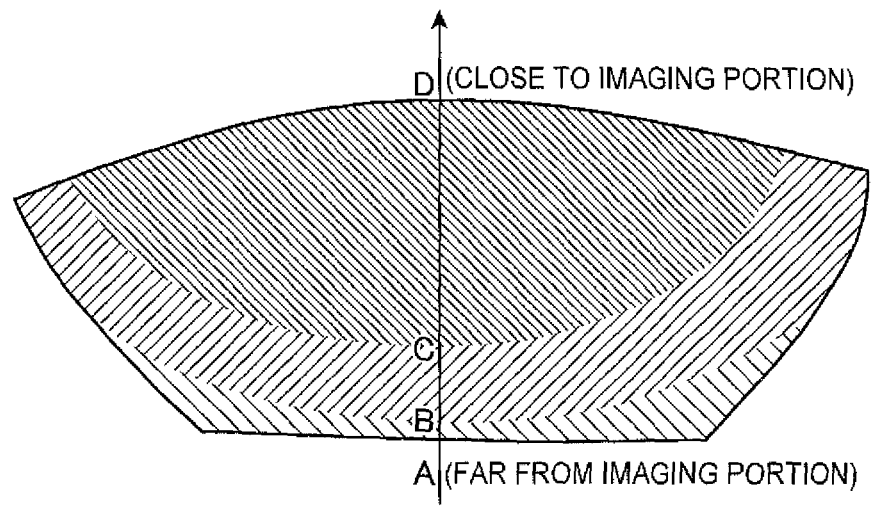
FIG. 15A is a diagram illustrating a concentration threshold value which is set in combination with the mask image.
Figure 15B:
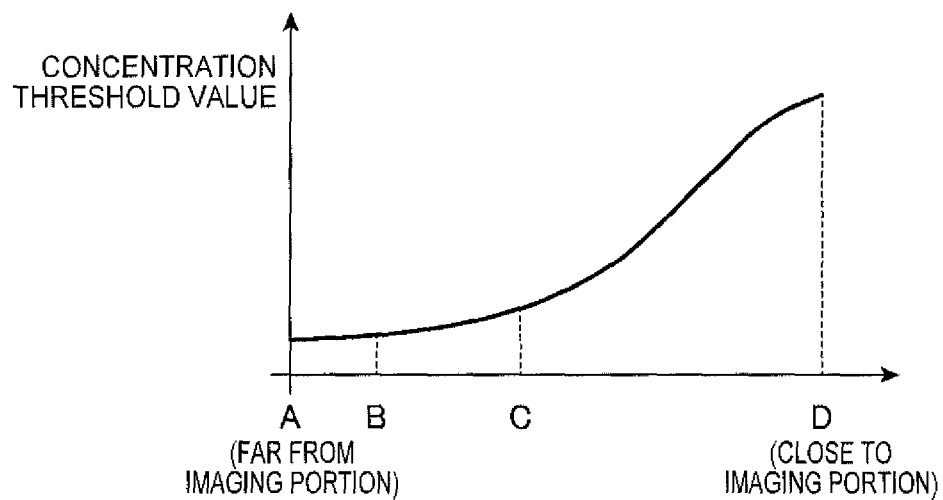
FIG. 15B is a diagram illustrating concentration threshold values in points A to D illustrated in FIG. 15A.

The captured image data processing portion 56 obtains the data of the first position detection image captured by the imaging portion 51. The captured image data processing portion 56 develops the obtained first position detection image data to the frame memory 58. The captured image data processing portion 56 performs the mask process by overlapping the mask image in the frame memory 58 in which the first position detection image data is developed (Step S121). Further, hereinafter, the first position detection image data in the area corresponding to the screen SC which is cut in the mask process is called cut image data. The captured image data processing portion 56 transmits the cut image data cut in the mask process to the indicator detecting portion 54. The indicator detecting portion 54 generates the differential image data in which the background noise is removed by subtracting the first background image data from the cut image data obtained from the captured image data processing portion 56 (Step S122). Next, the indicator detecting portion 54 binarizes the differential image data by using the concentration threshold value (Step S123). That is, the indicator detecting portion 54 detects the pixels in which the pixel value is equal to or greater than the concentration threshold value by comparing the pixel value of the differential image data and the concentration threshold value. An example of the concentration threshold value is illustrated in FIGS. 15A and 15B. FIG. 15A is a diagram illustrating the concentration threshold value which is set in combination with the mask image illustrated in FIG. 10, and FIG. 15B is a diagram illustrating concentration threshold values in points A to D illustrated in FIG. 15A.

The concentration threshold value according to the present embodiment is updated according to the distance from the imaging portion 51. In the data of the captured image captured by the imaging portion 51, the brightness of the captured image is lower as the distance from the imaging portion 51 to the subject is longer, and the brightness of the captured image is higher as the distance from the imaging portion 51 to the subject is shorter. Therefore, in the position detection portion 50, the concentration threshold value in the scope in which the distance from the imaging portion 51 is short is set to be great, and the concentration threshold value in the scope in which the distance from the imaging portion 51 is long is set to be small. In this manner, since the concentration threshold value is set to be obliquely installed, the infrared light of the indicator 70 and the other images in the captured image are easily discriminated. In the example illustrated in FIG. 15B, the concentration threshold value is set to be greatest at the point D at which the distance from the imaging portion 51 is closest, and the concentration threshold value is set to be smallest at the point A at which the distance from the imaging portion 51 is farthest.

If a pixel of which the pixel value detected by binarization is equal to or greater than the concentration threshold value is detected, the indicator detecting portion 54 divides pixels into blocks for each lump of detected pixels, and calculates centroid coordinates of the blocks of which the areas are in a certain scope (Step S124). The centroid coordinates refer to the positional central coordinates of the block. The calculation of the centroid coordinates is performed, for example, by respectively adding horizontal axis X components and vertical axis Y components of the coordinates that are allocated to the blocks and obtaining the averages thereof. The position detection portion 50 transmits the calculated centroid coordinates to the calibration control portion 39. The calibration control portion 39 determines the centroid coordinates obtained from the indicator detecting portion 54 to be the indication coordinates on the data of the captured image.

Further, in the example illustrated in FIG. 2, an example in which the position detection portion 50 includes the frame memory 58 is described. In the simple structure in which the position detection portion 50 does not include the frame memory 58, the captured image data processing portion 56 may perform the mask process by outputting only the first position detection image data in the screen SC area among the first position detection image data to the indicator detecting portion 54. Specifically, the captured image data processing portion 56 calculates the coordinate values of the area corresponding to the screen SC on the data of the captured image from the mask image obtained from the calibration control portion 39. Then, if the first position detection image data is obtained from the imaging control portion 53, the captured image data processing portion 56 outputs only the first position detection image data of the area corresponding to the screen SC to the indicator detecting portion 54 based on the calculated coordinate values.

Returning to FIG. 3, the calibration control portion 39 associates the indication coordinates on the data of the captured image and the coordinates on the auto calibration image 121 of the corresponding mark, and causes the storage portion 110 to store the associated coordinates (Step S12).

The calibration control portion 39 determines whether the indication positions with respect to the marks of all the manual calibration images 122 are detected (Step S13), and returns to Step S9 when there is an unprocessed mark. In addition, when the indication position of all the marks are detected, the calibration control portion 39 creates the manual calibration data 124 based on the coordinate indication positions temporarily stored in Step S12 and the positions of the marks (Step S14). Here, the created manual calibration data 124 is stored in the storage portion 110. Thereafter, the calibration control portion 39 proceeds to Step S15.

In Step S15, the calibration control portion 39 causes the projecting portion 20 to project the user interface for selecting whether the manual calibration related to the detection of the indication position of the indicator 80 is executed, and causes the user to perform a selection input.

The calibration control portion 39 detects the operation of the remote controller or the operation panel 19, and determines whether the manual calibration is executed (Step S16).

When the manual calibration is not executed (No in Step S16), the calibration control portion 39 selects the initial correction data 125 (Step S17) and proceeds to the normal operation (Step S18).

The normal operation projects the image to the screen SC based on the input image input to the image I/F portion 12, specifies the indication positions indicated by the indicators 70 and 80, and operates the processes corresponding to the indication content.

When the manual calibration relating to the operation of the indicator 80 is performed (Yes in Step S16), the calibration control portion 39 selects the manual calibration image 122 (Step S19).

Subsequently, the calibration control portion 39 projects the selected manual calibration image 122 by the projecting portion 20 to the screen SC (Step S20). Here, an operation using the indicator 80 is performed by the user (Step S21), and the calibration control portion 39 executes the indication position detecting process for detecting the indication position of the indicator 80 (Step S22). The indication position detecting process of Step S22 is a process performed in the same manner as the indication position detecting process of Step S11 described above, and executed as in FIG. 14.

Figure 16:
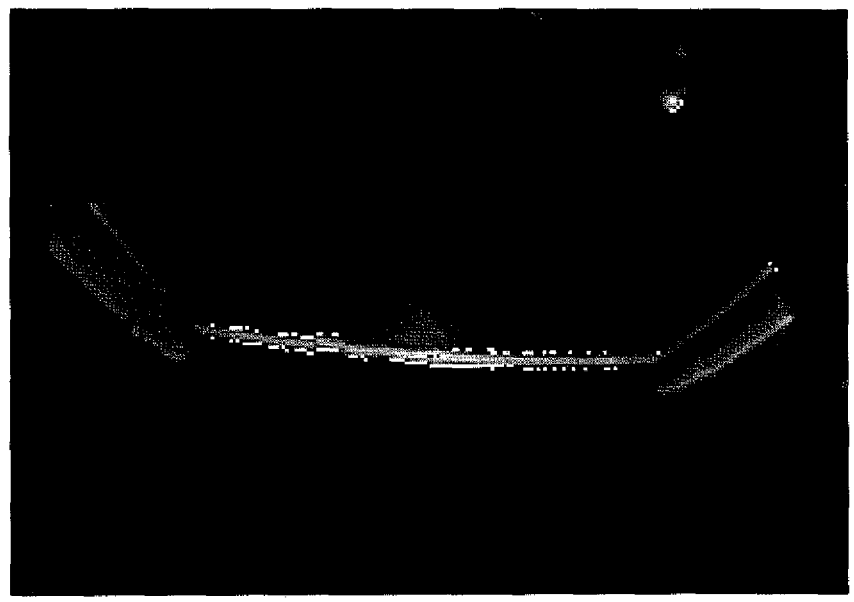
FIG. 16 is a diagram illustrating an example of the light source noise data.

In the indication position detecting process of Step S22, the position detection portion 50 (the indicator detecting portion 54) detects the indication coordinates pointed by a finger 80a by using the second position detection image data, the mask image, the first background image data, and the second background image data. Further, the second background image data is an image of the screen SC and the circumferences thereof which are captured while the light source portion 61 of the light emitting apparatus 60 is turned on. Therefore, in addition to the background noise recorded in the first background image data, the light generated from the light source portion 61 of the light emitting apparatus 60 and the reflected light thereof are recorded in the second background image data. The noise caused by the light generated by the light source portion 61 is called the light source noise. In Step S8, the calibration control portion 39 generates the light source noise data by subtracting the first background image data from the second background image data, and stores the light source noise data in the storage portion 110. FIG. 16 is a diagram illustrating an example of the light source noise data.

The position detection portion 50 generates the differential image data in which the background noise and the light source noise are removed by subtracting the first background image data and the light source noise data from the second position detection image data. Since the process after the differential image data is generated is the same as the process illustrated in FIG. 14, the description thereof is omitted. The position detection portion 50 transmits the calculated centroid coordinates to the calibration control portion 39. The calibration control portion 39 determines the centroid coordinates obtained from the position detection portion 50 to be the indication coordinates on the data of the captured image. Then, the calibration control portion 39 associates the indication coordinates on the data of the captured image and the mark coordinate values of the corresponding marks on the manual calibration image 122, and stores the associated values in the storage portion 110 (Step S23).

The calibration control portion 39 determines whether the indication positions with respect to all the marks of the manual calibration image 122 are detected (Step S24), and returns to Step S20 if there is an unprocessed mark. In addition, if the indication positions of all the marks are detected, the calibration control portion 39 creates the manual correction data 126 based on the coordinates of the indication positions and the positions of the marks which are stored in Step S23 (Step S25). Here, the created manual correction data 126 is stored in the storage portion 110. Thereafter, the calibration control portion 39 proceeds to Step S18, and starts the normal operation.

Further, the calibration control portion 39 may generate the manual calibration data 124 including data in the same manner as the auto calibration data 123 by the manual calibration of the indicator 70. In this case, the calibration control portion 39 generates the manual calibration data 124 which is the same as the auto calibration data 123 by the processes in Steps S8 to S14 of FIG. 3. In addition, the auto calibration data 123 and the manual calibration data 124 may be set to be the same data. In this case, the auto calibration data 123 generated before is overwritten by the data generated in Step S14.

In this configuration, if the calibration control portion 39 executes any one of the auto calibration or the manual calibration, it is possible to obtain the coordinates of the indication position of the indicator 70. Accordingly, in the operation of FIG. 3, when the auto calibration data 123 is not stored, it is possible to select the manual calibration in Step S1.

Figure 17:
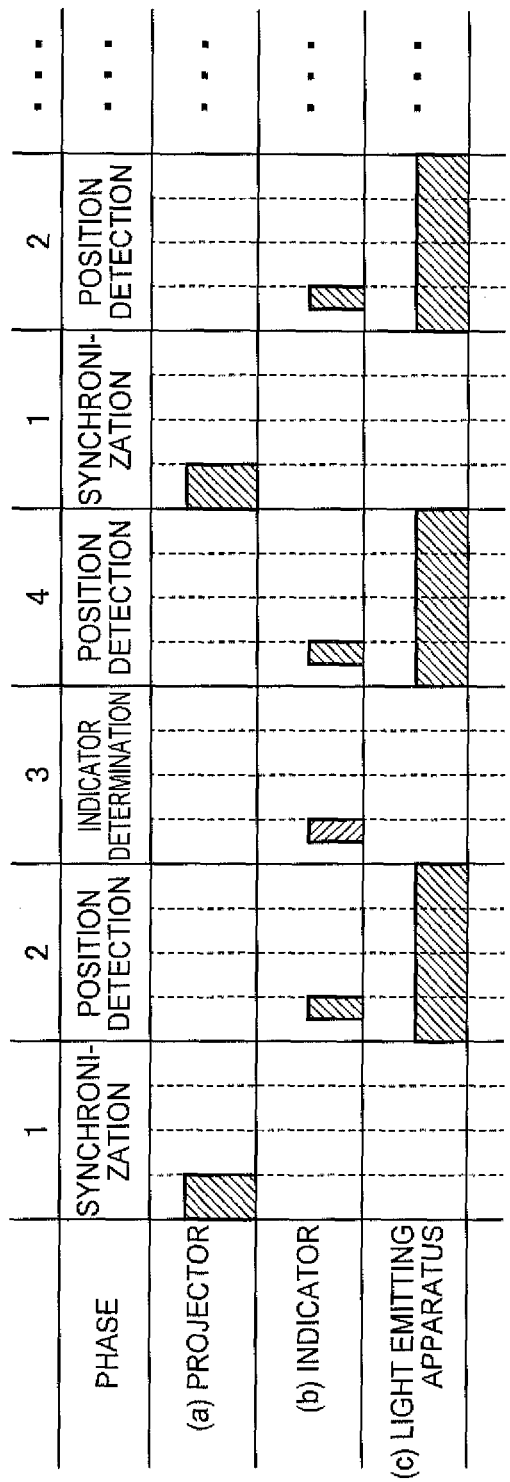
FIG. 17 is a diagram illustrating light emission timings of a projector, an indicator, and the light emitting apparatus.

Next, the light emission timings of the projector 10 (the transmitting portion 52), the indicator 70, and the light emitting apparatus 60 (the light source portion 61) in the normal operation are described with reference to the sequence diagram illustrated in FIG. 17.

In the present sequence, the projector 10 becomes the master apparatus, and the light emission timing is reported to the indicator 70 and the light emitting apparatus 60. The light source portion 61 of the light emitting apparatus 60 and the indicator 70 emit light according to the timing which is reported from the projector 10. In addition, four phases from the first phase to the fourth phase are included in the present sequence, and are repeated in the sequence from the first phase to the fourth phase. When the fourth phase ends, the process returns to the first phase, and the four phases repeat again from the first phase. Accordingly, the projector 10 reports the light emission timing to the indicator 70, and can perform the capturing in synchronization with the light emission timing of the indicator 70 or the light emitting apparatus 60.

The first phase is the synchronization phase. In the first phase, the light source of the transmitting portion 52 of the projector 10 is turned on, and the infrared signal for the synchronization is transmitted to the indicator 70. The indicator 70 can recognize the start timing of the first phase by receiving the infrared signal for the synchronization. Further, since the respective times of the first to fourth phases are set at the same time, the indicator 70 can recognize the start timings of the second to fourth phases by recognizing the start timing of the first phase.

The second phase is the position detection phase, and the light source portion 61 of the light emitting apparatus 60 and the indicator 70 are turned on. The projector 10 captures the capturing scope with the imaging portion 51 according to the lighting timings of the light source portion 61 and the indicator 70. Accordingly, when the indicator 80 points to the screen SC, the reflected light of the indicator 80 is taken on the data of the captured image of the imaging portion 51. In addition, the light by the indicator 70 is taken in the data of the captured image of the imaging portion 51.

The third phase is the phase provided in order to discriminate the indication positions of the indicator 70 and the indicator 80 based on the light emission timings of the indicator 70 and the light emitting apparatus 60. The third phase is the indicator determination phase, and the indicator 70 is turned on in the specific lighting pattern set in the indicator 70, and the light source portion 61 is not turned on. Therefore, the light from the indicator 70 is taken in the data of the captured image of the imaging portion 51. Among bright spots captured in the second phase, it is possible to detect a position of a bright spot taken in the data of the captured image captured in the third phase in which the light emitting apparatus 60 is turned on as the indication positions of the indicator 70. That is, among the indication coordinates detected from the data of the captured image captured in the second and fourth phases, the indication coordinates close to the indication coordinates detected from the data of the captured image captured in the third phase can be determined as the indication coordinates of the indicator 70.

In addition, an ID for identifying the indicator 70 is set in the indicator 70, and the indicator 70 in the third phase is turned on according to the set ID. When the plurality of indicators 70 are used, IDs are set for each of the indicators 70, and the respective indicators 70 are turned on according to the set IDs. For example, "1000" may be allocated as an ID of the indicator 70 to set the indicator 70 to be turned on at "1", and to set the indicator 70 to be turned off at "0". In this case, the indicator 70 is turned on in the third phase during the first time, and is turned off in the third phase during the second to fourth times. Accordingly, even if the indication operation is performed with the plurality of indicators 70, the projector 10 can detect the indication position of the respective indicators 70.

In addition, the fourth phase is the position detection phase which is the same as the second phase. The imaging portion 51 performs capturing while the light source portion 61 of the light emitting apparatus 60 and the indicator 70 are turned on. Further, the projector 10 may update the first and second background image data by capturing the capturing scope by the imaging portion 51, for example, in the first phase, the second phase, and the fourth phase. By updating the first and second background data even during the normal operation, the detection accuracy of the indication coordinates by the indicators 70 and 80 can be enhanced. For example, in the first phase, after the infrared signal for synchronization is transmitted, the projector 10 captures the capturing scope by the imaging portion 51. Since the data of the captured image captured in the first phase is the image data in which the indicator 70 and the light source portion 61 of the light emitting apparatus 60 are not turned on, the data of the captured image can be used as the first background image data. In addition, in at least one of the second and fourth phases, after the lighting of the indicator 70 ends, the projector 10 captures the capturing scope by the imaging portion 51 while the light source portion 61 of the light emitting apparatus 60 is turned on. The data of the captured image is the image data in which the indicator 70 is turned off and the light source portion 61 of the light emitting apparatus 60 is turned on. Therefore, the data of the captured image can be used as the second background image data.

As described above, the projection system 1 according to the present embodiment includes the light emitting apparatus 60 that emits detection light to the detection area for detecting indication positions of the indicators 70 and 80, and the projector 10 that detects the indication positions of the indicators 70 and 80 in the detection area. The projector 10 includes the imaging portion 51 and the position detection portion 50. The imaging portion 51 captures the detection area. The position detection portion 50 detects at least one of an image of the light generated by the indicator 70 and the image of the detection light reflected by the indicator 80 from the data of the captured image. Then, the position detection portion 50 discriminates and detects the indication positions of the indicator 70 and the indicator 80 based on the light emission timings between the indicator 70 and the light emitting apparatus 60. Therefore, even if the invention has a simple configuration, it is possible to accurately detect the indication positions of the different kinds of indicators by using the data of the captured image.

In addition, the position detection portion 50 detects the position of a bright spot taken in the data of the captured image captured after the light emitting apparatus 60 is turned off, as the indication position of the indicator 70. Accordingly, it is possible to easily discriminate the indicator 70 and the indicator 80, and it is possible to accurately detect the indication positions of the different kinds of the indicators 70 and 80.

In addition, the position detection portion 50 determines the light that the plurality of indicators 70 generate according to the identification information allocated for each of the indicators 70 based on the data of the captured image of the imaging portion 51, and discriminates and detects the indication positions of the plurality of indicators 70. Accordingly, even if the plurality of indicators 70 are provided, it is possible to discriminate the respective indicators 70 and detect indication positions of the respective indicators 70.

In addition, the projector 10 includes the transmitting portion 52 that transmits the infrared signal for synchronization to report the lighting timing of the indicators 70 and the emitting device driving portion 48 that transmits a signal for informing the timing for emitting the detection light to the light emitting apparatus 60, to the light emitting apparatus 60. Therefore, the projector 10 can synchronize lighting timing of the indicator 70 and the light emitting apparatus 60, and capture the detection area by the imaging portion 51. Accordingly, it is possible to detect the indication positions of the indicator 70 and the indicator 80.

Further, the embodiments and the modifications described above are merely specific examples to which the invention is applied, and the specific embodiments disclosed are not intended to limit the invention, and the invention may be applied according to another aspect. According to the embodiments above, for example, the indicator is not limited to the pen-type indicator 70 or the indicator 80 which is the finger of the user, and a laser pointer, an indication rod, or the like may be used, and the shape and the size thereof are not limited.

In addition, according to the present embodiment and the modification, the light emitting apparatus 60 is configured as a separate body from the main body of the projector 10, and is connected to the projector 10 through the cable 60*a*, but the invention is not limited to this. For example, the light emitting apparatus 60 may be mounted on the main body of the projector 10 in an integrated manner, or may be embedded in the main body of the projector 10. In addition, the light emitting apparatus 60 may receive power supply from the outside, and connected to the emitting device driving portion 48 through a wireless communication circuit.

In addition, according to the present embodiment, the position detection portion 50 specifies the position of the indicator 70 by capturing the screen SC by the imaging portion 51, but the invention is not limited to this. For example, the imaging portion 51 is not limited to be provided on the main body of the projector 10 and to capture the projection direction of the projection optical system 23. The imaging portion 51 may be arranged as a separate body from the main body of the projector 10, and the imaging portion 51 may perform capturing from the side direction of the screen SC or in front of the screen SC. Additionally, the plurality of imaging portions 51 are arranged, and the detection control portion 32 may detect the positions of the indicators 70 and 80 based on the data of the captured image of the plurality of imaging portions 51.

In addition, according to the embodiments described above, with respect to the indicator 70 from the projector 10, a configuration of transmitting a signal for the synchronization to the indicator 70 by using the infrared signal generated by the transmitting portion 52 is described, but the signal for the synchronization is not limited to the infrared signal. For example, the signal for the synchronization may be transmitted by radio wave communication or ultrasonic radio wave wireless communication. The configuration may be realized by providing a transmitting portion for transmitting a signal by radio wave communication or ultrasonic radio wave wireless communication to the projector 10, and a receiving portion for receiving a signal in the same manner to the indicator 70.

In addition, according to the embodiment described above, a configuration of using three transparent liquid crystal panels corresponding to the respective colors of RGB is described as the optical modulating device 22 for modulating the light generated by the light source, but the invention is not limited to this. For example, three reflective liquid crystal panels may be used, or a method of combining one liquid crystal panel and a color foil may be used. Otherwise, a method of using three sheets of digital mirror devices (DMD), or a DMD method of combining one digital mirror device and a color foil may be used. When a liquid crystal panel of one sheet only or DMD is used as the optical modulating device, a member corresponding to the synthesis optical system such as the cross dichroic prism is not required. Further, in addition to the liquid crystal panel and the DMD, if a device is an optical modulating device that can modulate the light generated by the light source, the device can be employed without a problem.

According to the embodiment, it is described that the user performs the indication operation by the indicators 70 and 80 with respect to the screen SC (a projection surface or a display surface) to which the front projection-type projector 10 projects (displays) an image, but the user may perform the indication operation to a display screen (display surface) on which a display apparatus (display portion) other than the projector 10 displays an image. In this case, the light emitting apparatus 60 or the imaging portion 51 may be configured to be integrated with the display apparatus, or may be configured to be a separate body from the display apparatus. As the display apparatus other than the projector 10, a rear projection (rear surface projection)-type projector, a liquid crystal display, an organic Electro Luminescence (EL) display, a plasma display, a cathode-ray tube (CRT) display, a Surface-conduction Electron-emitter Display (SED) or the like can be used.

In addition, respective functional portions of the projection system 1 illustrated in FIG. 2 indicates functional configurations, and the specific installation state is not particularly limited. That is, it is not always necessary to install hardware corresponding to the respective functional portions, and it is obvious that one processor can realize the functions of the plurality of functional portions by executing programs. In addition, a portion of the function realized by software in the present embodiment may be realized by hardware, or a portion of the function realized by the hardware may be realized by software. In addition, the specific detailed configuration of the respective portions in addition to the projection system 1 can be voluntarily changed without departing from the scope of the invention.

What is claimed is:

1. A position detection system comprising:
   a light emitting apparatus that emits detection light to a detection area; and
   a position detection apparatus that includes:
      a transmitting portion that transmits a synchronization signal that indicates a timing of light emissions of an indicator,
      an imaging portion that captures an image of the detection area, and
      a position detection portion that
         detects at least one of light generated by the indicator or light reflected by the indicator based on data of the image captured by the imaging portion, and
         determines whether the indicator is a light emitting indicator or an indicator that does not emit light based on a timing of light emissions of the light emitting apparatus.

2. The position detection system according to claim 1, wherein the position detection portion detects a position of a bright spot taken in the data of the captured image, while the light emitting apparatus is turned off, as an indication position of the indicator, if the indicator is determined to be the light emitting indicator.

3. The position detection system according to claim 1, wherein the position detection portion:
   determines timings of light that a plurality of respective light emitting indicators turn on and off according to identification information allocated to each of the plurality of respective light emitting indicators based on the data of the captured image, and
   discriminates and detects indication positions of each of the plurality of light emitting indicators based on the data of the captured image, the timings of light that the plurality of respective light emitting indicators turn on and off, and the identification information.

4. The position detection system according to claim 1, wherein
   the transmitting portion is a first transmitting portion; and the position detection apparatus further includes:
a second transmitting portion that transmits a signal that indicates a timing at which the detection light is emitted by the light emitting apparatus.

5. The position detection system according to claim 1, wherein the timing of light emissions of the light emitting apparatus is based on a synchronization signal that indicates a predetermined timing of light emissions.

6. The position detection system according to claim 1, wherein when an indication position of the indicator is detected in the image captured when the light emitting apparatus is turned off, the indicator is determined to be the ft-light emitting indicator.

7. A control method comprising:
transmitting, by a position detecting apparatus, a synchronization signal that indicates a timing of light emissions of an indicator;
capturing, by the position detecting apparatus, an image of a detection area;
detecting, by the position detecting apparatus, at least one of light generated by the indicator or light reflected by the indicator based on data of the captured image; and
determining, by the position detection apparatus, whether the indicator is a light emitting indicator or an indicator that does not emit light based on a timing of light emissions of the light emitting apparatus.

8. A position detection system comprising:
a light emitting apparatus that emits detection light to a detection area; and
a position detection apparatus that includes:
an imaging portion that captures an image of the detection area, and
a position detection portion that:
determines timings of light that a plurality of respective light emitting indicators turn on and off according to identification information allocated to each of the plurality of respective light emitting indicators,
detects at least one of light generated by an indicator or light reflected by the indicator based on data of the image captured by the imaging portion, and
based on the data of the captured image, the timings of light that the plurality of respective light emitting indicators turn on and off, and the identification information, determines whether the indicator is a light emitting indicator or an indicator that does not emit light, and discriminates and detects an indication position of each of the plurality of light emitting indicators detected in the detection area.

9. A position detection system comprising:
a light emitting apparatus that emits detection light to a detection area; and
a position detection apparatus that includes:
an imaging portion that captures an image of the detection area, and
a position detection portion that:
detects at least one of light generated by the indicator or light reflected by the indicator based on data of the image captured by the imaging portion, and
determines whether the indicator is a light emitting indicator or an indicator that does not emit light based on a timing of light emissions of the light emitting apparatus, wherein the timing of light emissions of the light emitting apparatus is based on a synchronization signal that indicates a predetermined timing of light emissions.

* * * * *